(12) United States Patent
Matsuo et al.

(10) Patent No.: US 10,091,804 B2
(45) Date of Patent: Oct. 2, 2018

(54) COMMUNICATION PROCESSING DEVICE

(71) Applicant: Kabushiki Kaisha Toshiba, Minato-ku (JP)

(72) Inventors: Ryoko Matsuo, Shinagawa (JP); Toshihisa Nabetani, Kawasaki (JP); Toshiyuki Nakanishi, Yokohama (JP); Hirokazu Tanaka, Bunkyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 213 days.

(21) Appl. No.: 15/057,537

(22) Filed: Mar. 1, 2016

(65) Prior Publication Data

US 2016/0183285 A1    Jun. 23, 2016

Related U.S. Application Data

(63) Continuation of application No. PCT/JP2014/073248, filed on Sep. 3, 2014.

(30) Foreign Application Priority Data

Sep. 3, 2013   (JP) .................................. 2013-182517

(51) Int. Cl.
*H04W 72/12*       (2009.01)
*H04W 74/00*       (2009.01)
(Continued)

(52) U.S. Cl.
CPC .......... *H04W 72/1247* (2013.01); *H04L 5/22* (2013.01); *H04W 72/0446* (2013.01);
(Continued)

(58) Field of Classification Search
CPC ......... H04W 72/1247; H04W 72/0446; H04W 72/1215; H04W 72/1252; H04W 74/006;
(Continued)

(56) References Cited

U.S. PATENT DOCUMENTS 7,042,856 B2   5/2006   Walton et al.
9,178,566 B2   11/2015  Okano et al.
(Continued)

FOREIGN PATENT DOCUMENTS

JP   2005-505954 A   2/2005
JP   2006-352191 A   12/2006
(Continued)

OTHER PUBLICATIONS

International Search Report dated Nov. 25, 2014 in corresponding PCT/JP2014/073248.
(Continued)

*Primary Examiner* — Paul H Masur
(74) *Attorney, Agent, or Firm* — Oblon, McClelland, Maier & Neustadt, L.L.P.

(57) ABSTRACT

According to one embodiment, a communication processing device is provided which is mounted on a wireless communication device that performs communication using a first channel and performs communication by a communication scheme different from that of the first channel using a second channel. The communication processing device includes a control circuitry to determine whether or not transmission data is data that needs to be preferentially transmitted, specify at least one channel from the first channel and the second channel according to a determination result, and perform control so as to transmit the transmission data using the specified channel.

21 Claims, 26 Drawing Sheets

(51) Int. Cl.
  *H04L 5/22* (2006.01)
  *H04W 72/04* (2009.01)
  *H04W 74/08* (2009.01)
  *H04W 88/06* (2009.01)

(52) U.S. Cl.
  CPC ... *H04W 72/1215* (2013.01); *H04W 72/1252* (2013.01); *H04W 74/006* (2013.01); *H04W 74/0808* (2013.01); *H04W 88/06* (2013.01)

(58) Field of Classification Search
  CPC .... H04W 74/0808; H04W 76/007; H04L 5/22
  See application file for complete search history.

(56) References Cited

U.S. PATENT DOCUMENTS

| | | | | |
|---|---|---|---|---|
| 2010/0195601 A1* | 8/2010 | Zhang | .................. | H04W 74/04 370/329 |
| 2012/0082036 A1 | 4/2012 | Abedi et al. | | |
| 2012/0119902 A1* | 5/2012 | Patro | ....................... | H04L 12/12 340/502 |
| 2012/0163279 A1 | 6/2012 | Tran et al. | | |
| 2012/0220232 A1* | 8/2012 | Okano | ..................... | H04B 5/00 455/41.2 |
| 2014/0119257 A1* | 5/2014 | Cho | .................... | H04W 76/007 370/311 |
| 2014/0293976 A1* | 10/2014 | Huang | .................. | H04W 74/04 370/337 |
| 2014/0369339 A1* | 12/2014 | Nekoui | ................. | H04W 74/04 370/348 |

FOREIGN PATENT DOCUMENTS

| | | |
|---|---|---|
| JP | 2011-199581 A | 10/2011 |
| JP | 2012-519994 A | 8/2012 |
| JP | 2012-178680 A | 9/2012 |
| WO | WO 2012/005000 A1 | 1/2012 |

OTHER PUBLICATIONS

IEEE Std 802.15.6™-2012, IEEE Standard for Local and metropolitan area networks Part 15.6: Wireless Body Area Networks, 2012, 270 pages.

* cited by examiner

US 10,091,804 B2

COMMUNICATION PROCESSING DEVICE

CROSS REFERENCE TO RELATED APPLICATIONS

This application is a Continuation of International Application No. PCT/JP2014/073248, filed on Sep. 3, 2014, the entire contents of which is hereby incorporated by reference.

FIELD

Embodiments described herein relate to a communication processing device, an integrated circuit, a wireless communication terminal, a memory card, a wireless communication device, and a wireless communication method.

BACKGROUND

As a wireless network to be formed in a human body, a network called a body area network is known. For the body area network, for example a hub as a center device and a node as a terminal device are mounted on a human body and communication is performed between the hub and the node. A terminal includes a biosensor, and wirelessly transmits information or the like acquired in the biosensor to the center device. Depending on the information to be wirelessly transmitted, there is the one that needs to be preferentially and surely transmitted as emergency data. In IEEE802.15.6 which is a standard specification relating to the body area network, a mechanism of allocating time exclusive for the emergency data immediately after a transmission timing of a beacon signal is used as a measure for the time of emergency data generation.

Also, though not the body area network, a mechanism of securing transmission time of the emergency data by having the node transmit an emergency communication request when the emergency data is generated is considered. The emergency communication request is sent by a control channel of a high priority degree for the emergency data. In this method, an access point which receives the emergency communication request notifies all the terminals that there is emergency data transmission at the next downlink timing. Thereafter, the node where the emergency data is generated occupies the control channel and a data channel and transmits the emergency data, and the other nodes stop transmission and reception during the period.

Also, as a different method, a mechanism of transmitting the same data again by the other data channel in the case of important data is also considered. The other data channel is used only when transmitting backup data when the important data is generated, and the backup data of the important data is transmitted at a predetermined timing.

By a conventional scheme of IEE802.15.6, it is needed to allocate the time for the emergency data transmission beforehand, and the allocated time is wasted in a normal operation in which the emergency data is not generated. Also, in the above-described method using the control channel of the high priority degree, while a scheme using the plurality of control channel and data channels is a prerequisite, when the emergency data is generated, it is needed to make the other nodes perform an operation different from a normal operation. Further, in the method of retransmitting the important data by the other data channel, it is needed to secure the data channel for the backup transmission.

DETAILED DESCRIPTION

According to one embodiment, a communication processing device is provided which is mounted on a wireless communication device that performs communication using a first channel and performs communication by a communication scheme different from that of the first channel using a second channel. The communication processing device includes a control circuitry to determine whether or not transmission data is data that needs to be preferentially transmitted, specify at least one channel from the first channel and the second channel according to a determination result, and perform control so as to transmit the transmission data using the specified channel.

Hereinafter, embodiments of the present invention will be described with reference to the drawings.

Embodiment 1

Figure 1:
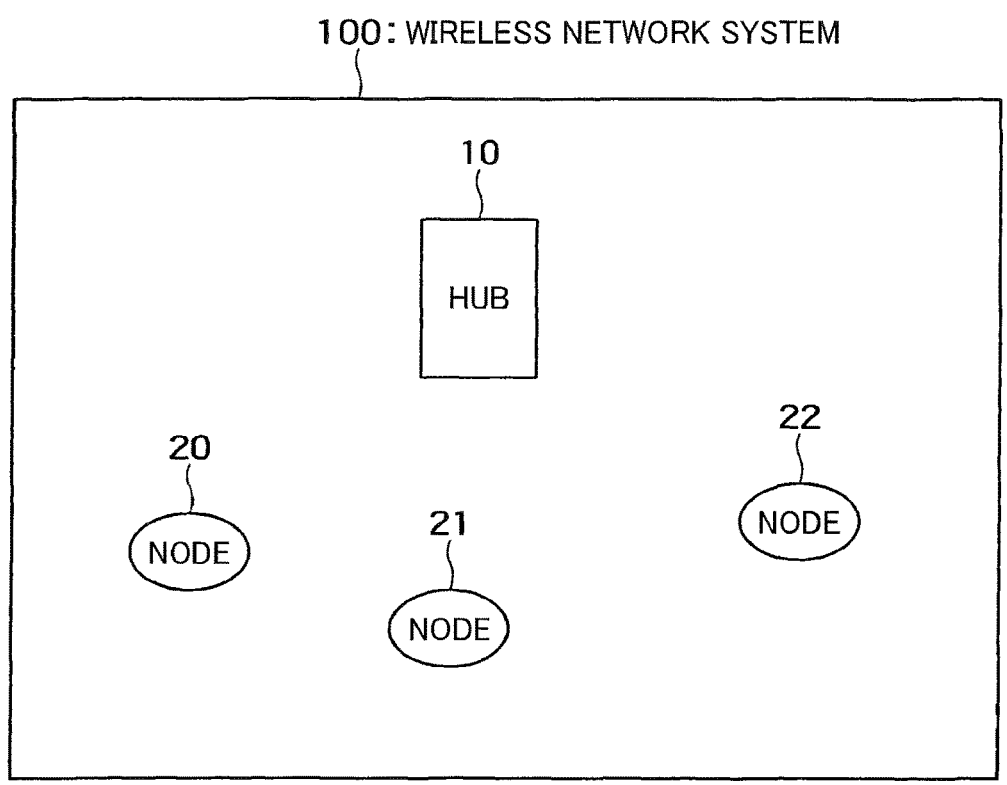
FIG. 1 is a diagram illustrating one example of a wireless network system relating to an embodiment 1.

FIG. 1 illustrates one example of a wireless network system relating to an embodiment 1. A wireless network system 100 illustrated in FIG. 1 includes a hub 10 and a plurality of nodes 20, 21 and 22. The hub 10 includes a wireless communication device that is operated as a center device. Each node includes a wireless communication device that is operated as a terminal of the center device. The wireless communication device of the hub 10 is an object communication device for the nodes 20, 21 and 22, and the wireless communication devices of the nodes 20, 21 and 22 are object communication devices for the hub 10.

Each node incorporates one or more sensors for example, and wirelessly transmits sensing information acquired by the sensor to the hub 10. Also, each node wirelessly receives control information or the like needed for communication from the hub. In the case of a body area network, each node and the hub are mounted on a human body. Mounting on a human body may include all cases of arrangements at a position close to a human body such as a form of being in direct contact with a human body, a form of being mounted on clothes, a form of being provided on a cord put around the neck, and a form of being housed in a pocket. For the sensor, a biosensor such as a sleep sensor, an acceleration sensor, an electrocardiogram sensor, a body temperature sensor and a pulse sensor is assumed. However, the present embodiment is not limited to the body area network, and an arbitrary network can be constructed as long as a hub and nodes can be arranged. For example, the hub and the nodes may be installed to a living body other than a human body, such as an animal or a plant, or may be installed to a plurality of parts (a body and wheels for example) of an object other than a living body, such as an automobile.

The hub and the nodes perform transmission and reception using a control channel (Cch) and a data channel (Dch) respectively. There is one each of the control channel and the data channel for example, and they belong to mutually different frequency bands. However, one or both of the control channel and the data channel may be plural. While a communication scheme used in the control channel and the data channel is not limited to a specific one, in the present embodiment, the communication scheme using carrier sense, specifically a CSMA (Carrier Sense Multiple Access)-based communication scheme is presupposed for the control channel, and a TDMA (Time Division Multiple Access)-based communication scheme is presupposed for the data channel.

Figure 3A:
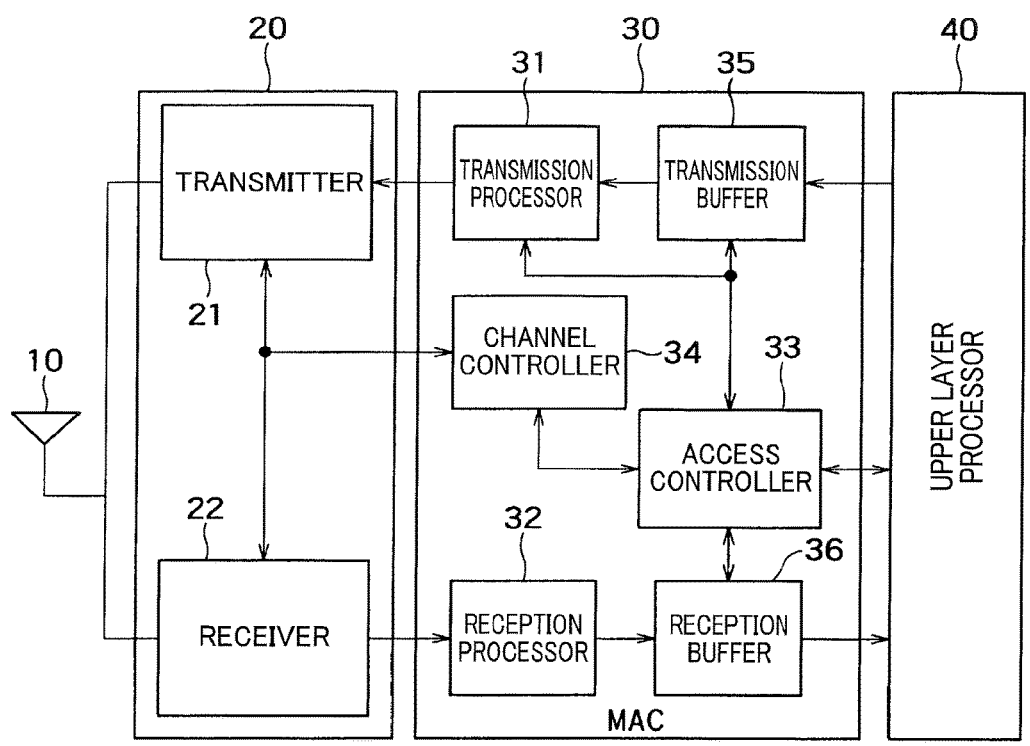
FIG. 3A is a block diagram of a wireless communication device in a hub relating to the embodiment 1.

FIG. 3A illustrates a block diagram of the wireless communication device in the hub relating to the present embodiment. The hub includes an antenna 10, a PHY&RF unit 20, a MAC unit 30 which is a communication processing device relating to the present embodiment, and an upper layer processor 40. The PHY&RF unit 20 includes a transmitter 21 and a receiver 22. The MAC unit 30 includes a transmission processor 31, a reception processor 32, an access controller 33, a channel controller 34, a transmission buffer 35, and a reception buffer 36.

The access controller 33 manages access of the control channel and the data channel, and controls the transmission of beacon signals in the individual channels at a desired timing. When the access controller 33 instructs the transmission processor 31 to transmit the beacon signal of the control channel or the data channel, the transmission processor 31 generates a frame of the beacon signal of the control channel or the data channel, and outputs the generated frame to the transmitter 21.

The transmitter 21 performs the transmission through the control channel and the transmission through the data channel. The receiver 22 performs the reception through the control channel and the reception through the data channel.

A beacon signal frame of the control channel is transmitted through the control channel, and a beacon signal frame of the data channel is transmitted through the data channel. A data frame is transmitted through the data channel as described later. Also, frame reception through the control channel is performed in a state that the receiver 22 is set for the control channel, and frame reception through the data channel is performed in a state that the receiver is set for the control channel.

The transmitter 21 performs processing of a desired physical layer and performs D/A conversion and frequency conversion or the like to a frame inputted from the transmission processor 31, and transmits signals to space as radio waves through the antenna 10.

The receiver 22 receives the signals through the antenna 10, performs reception processing, and outputs the processed frame to the reception processor 32. The reception processing may include desired physical layer processing such as frequency conversion to a baseband, A/D conversion, analysis of a physical header of the frame after the A/D conversion, and demodulation processing.

The channel controller 34 controls setting of the PHY&RF unit 20, that is, the setting of the transmitter 21 and the receiver 22. The channel controller 34 sends operation channel information specifying a No. of the channel to be used (the data channel or the control channel) to the PHY&RF unit 20 according to an instruction from the access controller 33, and the PHY&RF unit 20 switches the channel to be used for the transmission according to the operation channel information. Note that, in the case of a configuration that two systems of the transmitters and receivers are prepared for the data channel and the control channel, it is also possible to independently operate each of them without switching the channel. In this case, the antenna is arranged respectively corresponding to the individual transmitters and receivers.

The reception processor 32 performs analysis of a MAC header of the frame inputted from the receiver 22 or the like. In the case of receiving a connection request signal frame from the node, the reception processor 32 notifies a connection request from the node to the access controller 33. The access controller 33 determines a response to an allocation to the connection request, and notifies a determination result to the transmission processor 31. For example, time (slot) to be allocated to the node is determined, that is, the number of slots and positions of the slots are determined. The transmission processor 31 generates the frame of a connection response signal according to the determination result of the access controller 33. In the case that a connection request signal includes a sensor type that the node corresponds to or information similar to it, the access controller 33 may notify the information to the upper layer processor 40. The upper layer processor 40 may determine the number of allocation slots to the node on the basis of the information. In this case, the upper layer processor 40 notifies the information of the determined number of the allocation slots to the access controller 33, and the access controller 33 allocates the slots from the notified information of the number of the allocation slots or the like. The access controller 33 makes the transmission processor 30 generate the frame of the connection response signal including slot allocation information, and transmits it from the transmitter 21 through the control channel to the node.

Also, in the case that the received frame is a data frame from the analysis of the MAC header of the frame inputted from the receiver 22 or the like, the reception processor 32 outputs the processed frame to the upper layer processor 40 as needed.

Note that, when there is downlink data to be individually transmitted to the nodes, the upper layer processor 40 delivers the data frame including the data to the transmission processor 31. The access controller 33 instructs the transmission processor 31 to transmit the data frame by a slot for downlink secured by an arbitrary method (for example, a method using the beacon signal of the data channel or the control channel) to the nodes. The transmission processor 31 executes MAC header addition processing or the like to the frame, and outputs the processed frame to the transmitter 21. The transmitter 21 transmits the frame inputted from the transmission processor 31 through the data channel. Specifically, to the frame, the desired physical layer processing such as modulation processing and physical header addition is performed. Then, the D/A conversion and the frequency conversion are performed to the processed frame, and the signals are radiated to the space as the radio waves through the antenna 10.

Figure 3B:
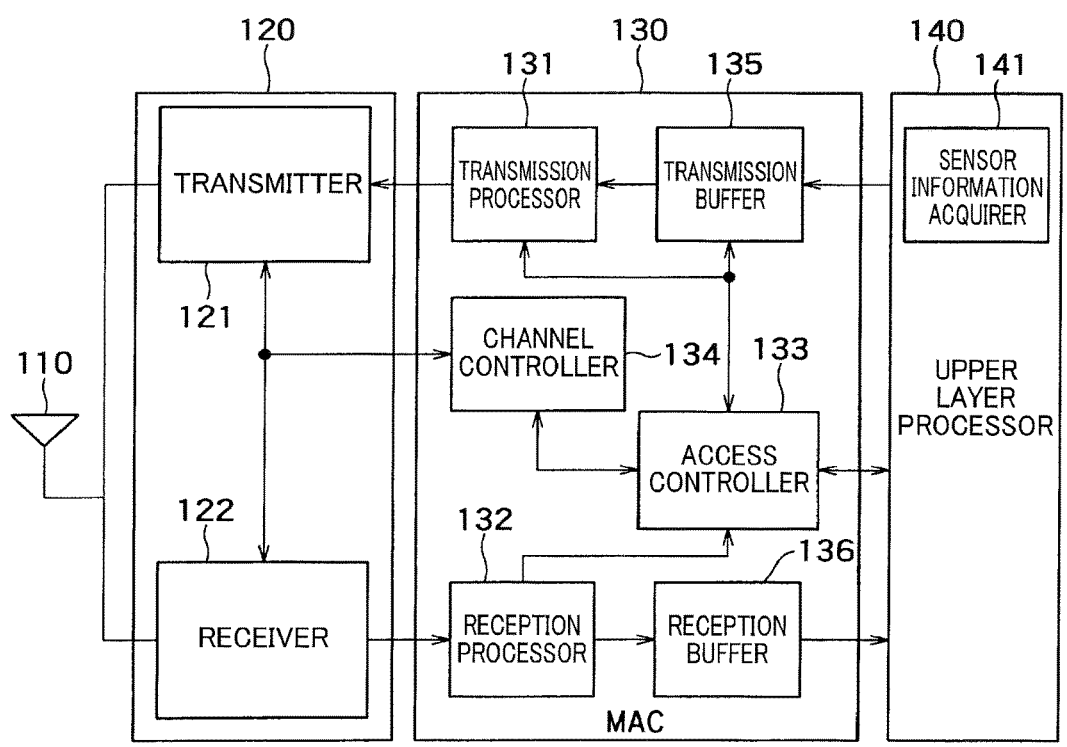
FIG. 3B is a block diagram of the wireless communication device in the hub relating to the embodiment 1.

FIG. 3B illustrates a block diagram of the wireless communication device in the node relating to the present embodiment. The node includes an antenna 110, a PHY&RF unit 120, a MAC unit 130 which is a communication processing device relating to the present embodiment, and an upper layer processor 140 which is a sensor controller. The PHY&RF unit 120 includes a transmitter 121 and a receiver 122. The MAC unit 130 includes a transmission processor 131, a reception processor 132, an access controller 133, a channel controller 134, a transmission buffer 135, and a reception buffer 136. The upper layer processor 140 includes a sensor information acquirer 141 that acquires information of the sensor.

The information of the sensor may include not only sensing information of the sensor but also information that specifies a state of the sensor and information of the sensing time or the like.

The upper layer processor (sensor controller) 140 requests transmission to the access controller 133 so as to be connected with the hub at a predetermined timing such as the time of activation and the time of transmission data generation. Also, the upper layer processor 140 generates a data frame including transmission data such as the sensing information, and outputs it to the transmission buffer 135. Transmission data may be the sensing information acquired by the sensor such as the biosensor, data of a result of processing the sensing information by an application or the like, or data including the state of the node at present or the like, but is not limited to specific data.

Here, the upper layer processor 140 includes a data type of the transmission data in the transmission data or the data frame. The data type may be a kind of the sensor that the node includes for example, may be importance of the sensing information determined from a value of the sensing information, or may be a value indicating whether the state of the sensor is normal or abnormal. The data type is used to determine whether to preferentially transmit the transmission data.

The upper layer processor 140 may be configured by a processor such as a CPU, may be configured by hardware, or may be configured by both of the software and the hardware. The upper layer processor 140 may perform processing of a communication protocol of an upper layer of a MAC layer such as TCP/IP or UDP/IP.

When the transmission request is received from the upper layer processor 140, the access controller 133 outputs a transmission instruction of the connection request signal to the transmission processor 131, and the transmission processor 131 outputs the frame of the connection request signal to the transmitter 121.

The transmitter 121 performs the transmission through the control channel and the transmission through the data channel. The receiver 122 performs the reception through the control channel and the reception through the data channel.

The beacon signal frame of the control channel is received through the control channel, and the beacon signal frame or the data frame of the data channel is received through the data channel.

The channel controller 134 sends the operation channel information to the PHY&RF unit 120 according to an instruction from the access controller 133, and the PHY&RF unit 120 switches the data channel and the control channel.

Note that a configuration may be such that the control channel and the data channel can be simultaneously used by preparing two antennas in the node and preparing the transmitters and the receivers respectively for the data channel and the control channel. In this case, ON/OFF of the respective operations may be controlled by power supply to a circuit.

The reception processor 132 performs the analysis of the MAC header of the frame inputted from the receiver 122 or the like.

When the reception signal is the connection response signal, the connection response is notified to the access controller 133. When the connection response is received, the access controller 133 determines to switch an operation channel from the control channel to the data channel, and notifies channel changeover to the channel controller 134.

The channel controller 134 instructs the PHY&RF unit 120 to set changeover to the data channel.

The access controller 133 controls access to the data channel based on the information of the allocation slots of the data channel included in the connection response signal. The access controller 133 recognizes a frame holding status of the transmission processor 131, and instructs the transmission processor 131 to transmit the data frame at the timing of the slot allocated to the own node. The transmission processor 131 executes the MAC header addition processing or the like to the data frame, and outputs it to the transmitter 121.

Here, in the transmission buffer 135, queue management of the frame (QoS management) is performed based on the data type of the data frame inputted from the upper layer processor 140. When the data frame is inputted from the upper layer processor 140, the transmission buffer 135 outputs the data type of the data frame to the access controller 133 together with the transmission request of the data frame. The access controller 133 recognizes a queue state of the transmission buffer on the basis of the information inputted from the transmission buffer 135.

When the transmission request and the data type of the data frame are inputted from the transmission buffer 135, the access controller 133 determines whether or not the data included in the data frame is the data (emergency data, hereinafter) that needs to be transmitted preferentially over the others, according to the data type. For example, in the case that the data type is the type of the sensor, whether or not it is the emergency data may be defined according to the type of the sensor. Or, a priority degree may be obtained on the basis of a table in which the type of the sensor and the priority degree are made to correspond, and the data frame whose priority degree is the highest or is equal to or higher than a fixed value may be determined as the emergency data. Also, in the case that the data type is the value indicating whether the sensor is normal or abnormal, it may be determined as the emergency data when the data type indicates abnormality.

In the case of determining that it is not the emergency data, the access controller 133 determines to send the data frame by the slot allocated beforehand of the data channel. For the data frame determined such, the queue management is performed in the transmission buffer 135 as a normal data frame, and the access controller 133 determines the data frame to be transmitted next according to the queue state of the transmission buffer 135, and executes control so as to perform transmission by the slot allocated beforehand of the data channel. Or, a frame output order may be controlled by the transmission processor 131 or the transmission buffer 135. In this case, the access controller 133 issues a transmission instruction to the transmission processor 131 according to the timing of the allocation slot of the data channel. The transmission processor 131 determines the data frame to be transmitted next according to the frame output order control, reads it from the transmission buffer 135, performs the MAC processing of the read frame, and transmits the processed frame through the transmitter 121.

On the other hand, in the case that the access controller 133 determines that the data frame includes the emergency data, the access controller 133 determines to most preferentially transmit the data frame. In that case, the access controller 133 determines to send the data frame including the emergency data through the control channel. The access controller 133 sends a change instruction to the control channel to the channel controller 134, and sends a read instruction of the data frame including the emergency data to the transmission processor 131. The transmission processor 131 reads the instructed data frame and outputs it to the transmitter 121. The access controller 133 may issue an output instruction of the data frame including the emergency data to the transmission buffer 135 instead of sending the read instruction of the data frame including the emergency data to the transmission processor 131. At the time, the access controller 133 may determine the emergency data as highest priority data of MAC, and instruct the channel controller 134 to set a contention window and backoff value of CSMA to be smaller than that of the other data, and the channel controller 134 may adjusts parameters of CSMA according to the instruction. Thus, even at the time of CSMA-based access, the data can be preferentially transmitted.

In the case that the received frame is the data frame as a result of the analysis of the MAC header of the frame inputted from the receiver 122 or the like, the reception processor 132 outputs the processed frame through the reception buffer 136 to the upper layer processor 140 as needed.

Note that the channel controller 134 and the access controller 133 may hold the information needed for the control in the inside respectively, or may hold it in an accessible storage not shown in the figure. For example, a status of the node, a status of the hub, a channel No. of the data channel, and the information of the current operation channel or the like may be held. For example, as the status of the node, information on whether or not connection processing is completed and information of a battery residual amount may be included. Also, as the status of the hub, the information of the transmission timing for the beacon signal of the control channel and the beacon signal of the data channel and an ON/OFF state of a power source of the hub may be included, and the other information may be also included.

Hereinafter, as an operation example of the node, an example of transmitting the connection request signal, receiving the allocation of the slot and transmitting the data frame will be indicated. On the basis of the transmission request from the upper layer processor 140, the access controller 133 manages the access of the control channel and instructs the transmission processor 131 to transmit the connection request signal. The transmission processor 131 generates the frame of the connection request signal and transmits it through the control channel of the transmitter 121, and the access controller 133 waits for the connection response signal from the hub.

The access controller 133 instructs the channel controller 134 to switch the operation channel from the control channel to the data channel with the reception of the connection response signal as a trigger, and the channel controller 134 notifies the operation channel information according to the instruction to the PHY&RF unit 120. The PHY&RF unit 120 switches the operation channel to the data channel according to the operation channel information. Also, the access controller 133 manages the access to the data channel on the basis of the information of the allocation slot in the data channel included in the connection response signal. The access controller 133 recognizes the frame holding status of the transmission processor 131, and instructs the transmission processor 131 to transmit the data frame at the timing of the allocation slot of the own node.

Figure 2:
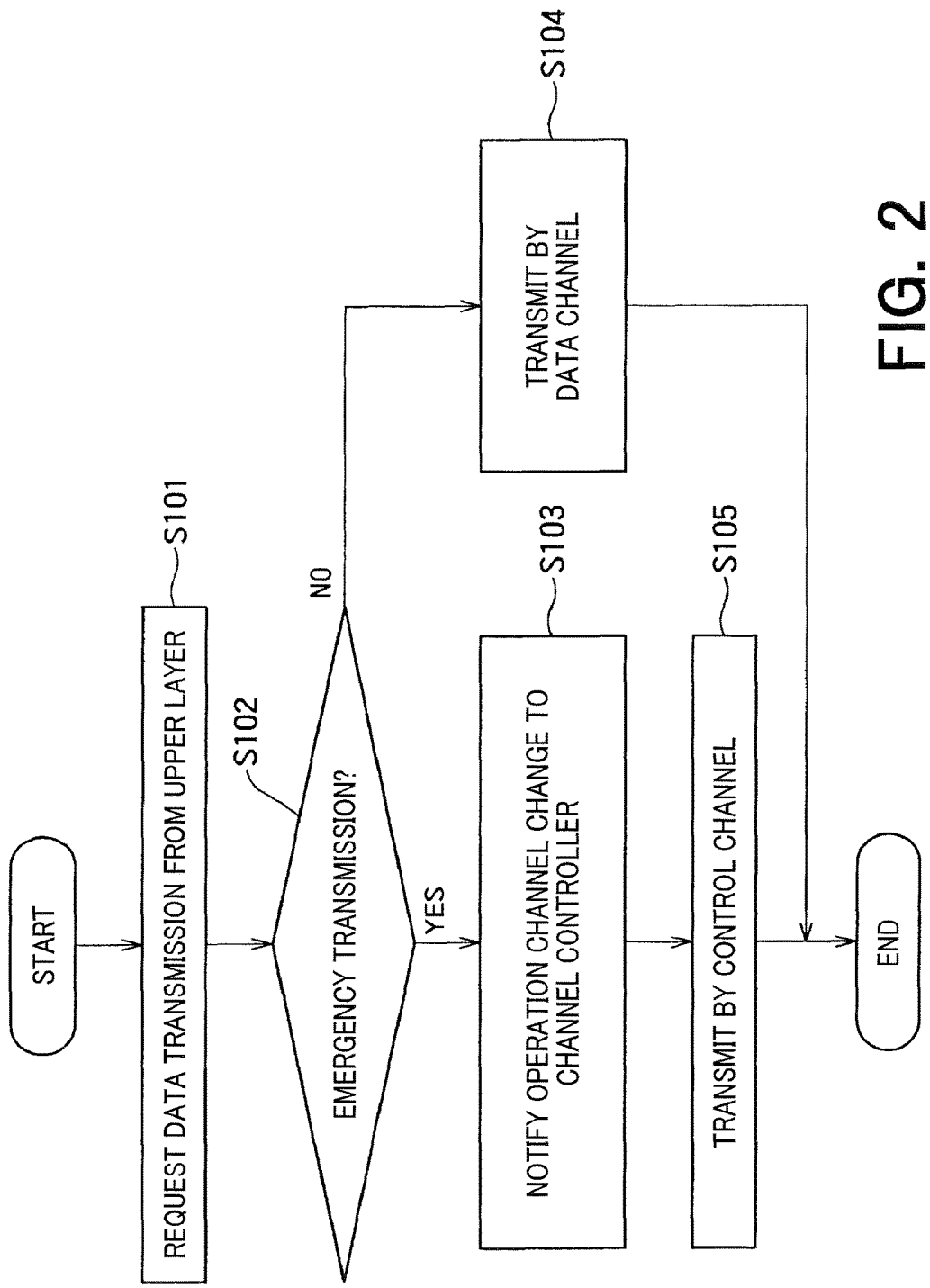
FIG. 2 is a flowchart of processing relating to the embodiment 1.

Next, as another operation example of the node, an operation when the emergency data is detected will be described. FIG. 2 illustrates a processing flow of the node in the present embodiment.

The upper layer processor 140 or the sensor information acquirer 141 outputs the data frame including the data such as sensor information to the transmission buffer 135 (S101). When the data frame is inputted, the transmission buffer 135 notifies the transmission request and the data type of the data frame to the access controller 133, and in the access controller 133, whether the data frame includes the emergency data, that is, whether it is needed to urgently transmit the data frame, is determined from the data type (S102).

A determination method is as described above.

When it is determined as the frame including the emergency data, the access controller 133 determines to transmit the frame through the control channel. In this case, the access controller 133 instructs the channel controller 134 to switch the operation channel to the control channel (S103), and instructs the transmission processor 131 to transmit the emergency data frame. The transmission processor 131 reads the frame from the transmission buffer 135, performs needed processing, and transmits it through the control channel of the transmitter 121 (S105).

On the other hand, in the case of determining that it is not the data frame including the emergency data in step S102, the access controller 133 determines to transmit the data frame by the slot of the data channel as usual. The data frame is managed in the transmission buffer 135, outputted from the transmission buffer 135 at the timing according to the QoS control, and transmitted by the allocation slot of the data channel (S104).

Note that, though whether or not emergency transmission is to be performed is determined on the basis of the data type included in the data frame in the present embodiment, a method of determining whether or not to perform the emergency transmission is not limited to this. For example, an emergency transmission instruction may be inputted from the upper layer processor to the access controller separate from the data frame, and the access controller may determine the data frame for which the emergency transmission is instructed as an object of the emergency transmission. Also, all the data frames to be transmitted within a fixed period after the emergency transmission is instructed may be determined as the object of the emergency transmission.

As described above, the wireless communication device relating to the first embodiment can increase the possibility of performing the transmission more urgently than the transmission using the allocation slot of the data channel by transmitting the emergency data using the control channel. Also, in the nodes other than the node where the emergency data is generated (emergency data generation node), since the emergency data generation node transmits the data through the control channel, even though a busy detection rate of the control channel becomes high during the time, the other nodes are not needed to perform special processing of refraining from utilization of the data channel or the like. That is, in the case that the emergency data generation node transmits the emergency data, the other nodes are not needed to perform the processing different from usual.

Embodiment 2

Since a block diagram of the nodes of the present embodiment is similar to that of the embodiment 1, description will be given hereinafter based on the block diagram in FIG. 3B used in describing the embodiment 1. It is assumed that the TDMA scheme is used in the data channel and the CSMA scheme is used in the control channel in the present embodiment as well. In the present embodiment, the operation of the access controller 133 is different from that in the embodiment 1. The description of the operations that overlap with the embodiment 1 will be omitted.

Figure 6:
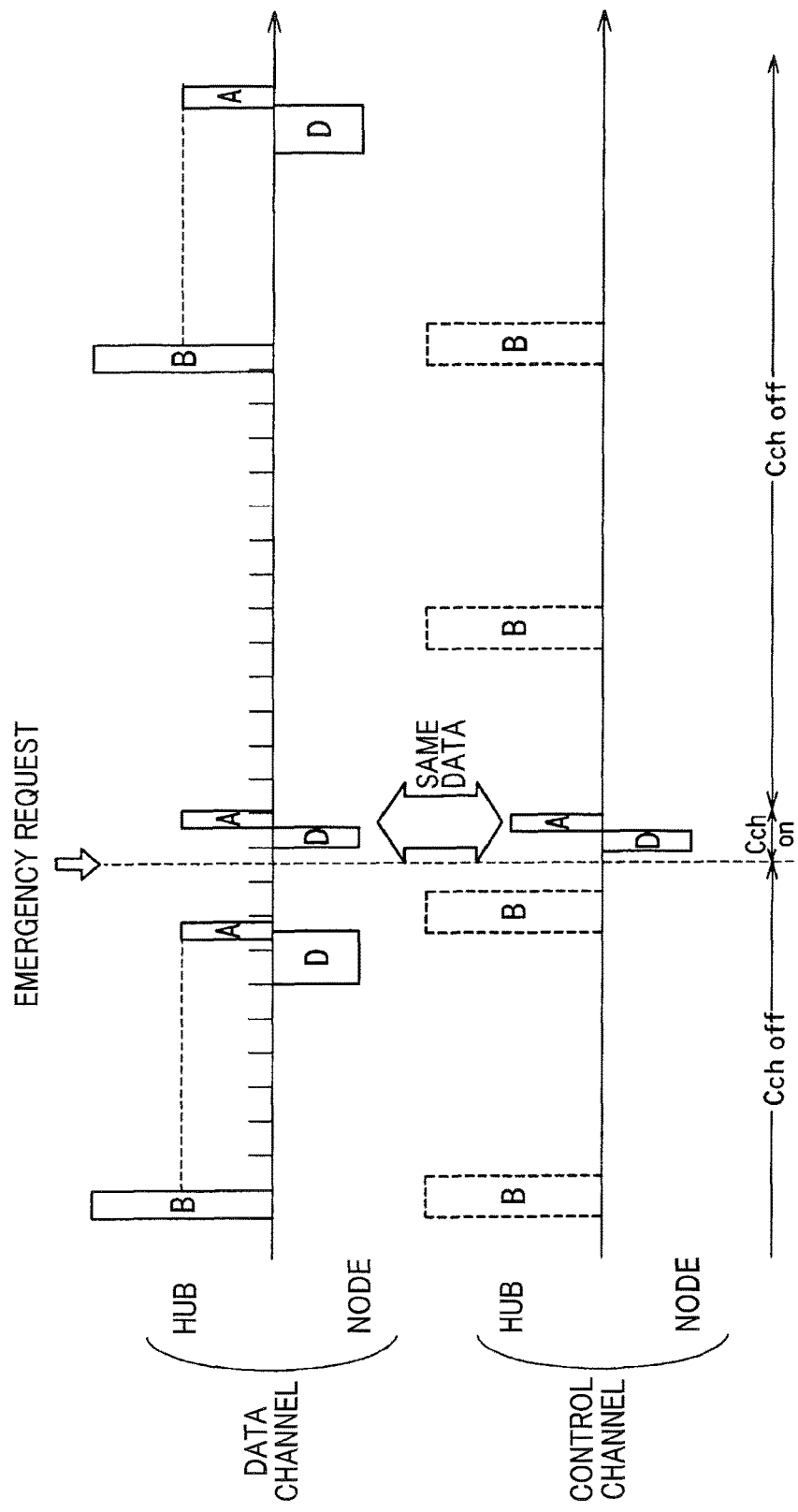
FIG. 6 is a timing chart of an emergency allocation node relating to the embodiment 3.
Figure 7:
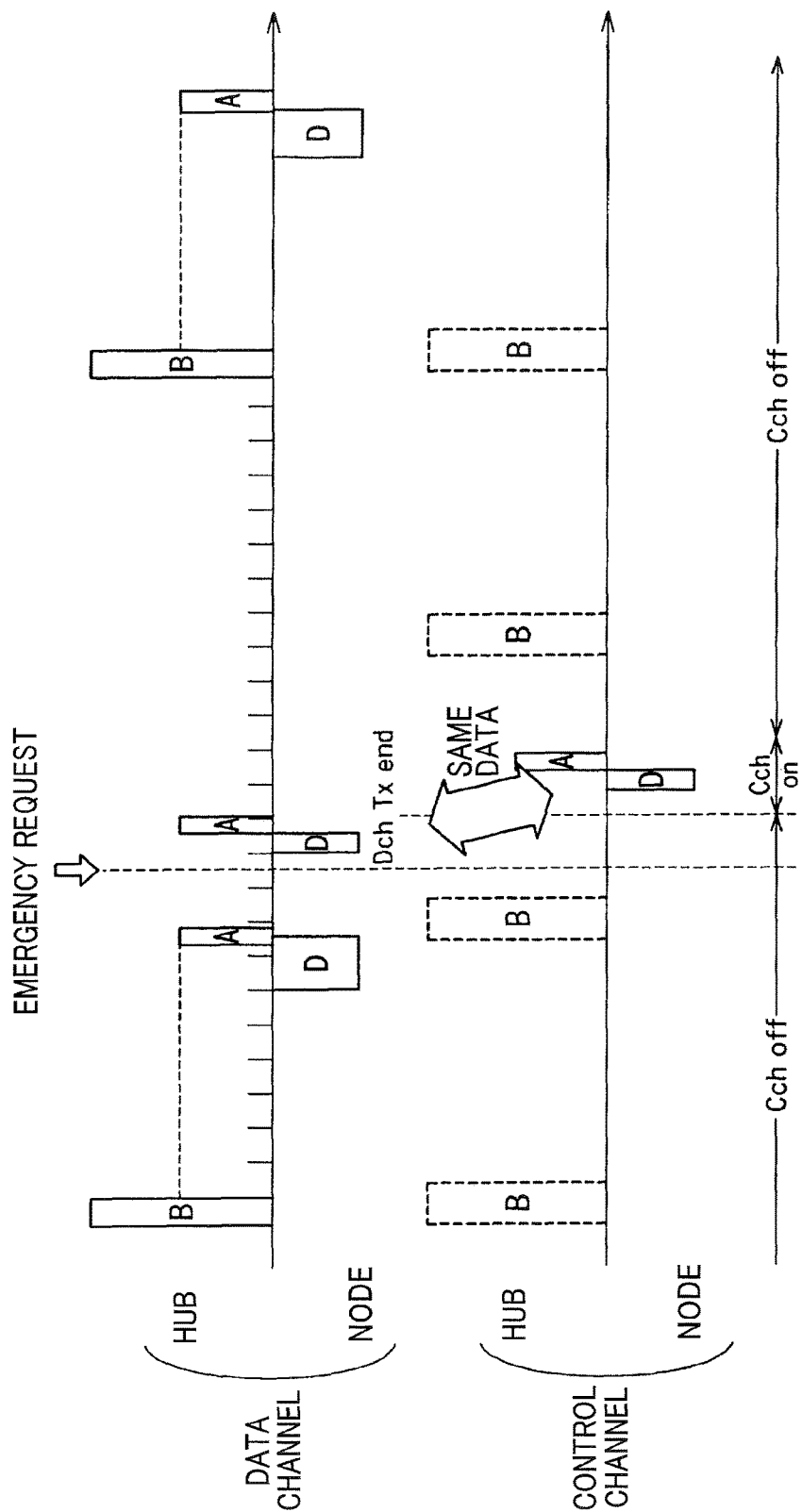
FIG. 7 is a timing chart of the emergency allocation node relating to the embodiment 3.

In the present embodiment, the case of a form that the allocation slots to the individual nodes of the data channel are arranged altogether within the time that continues from the transmission of the beacon signal of the data channel by the hub and the slots are available until the next beacon signal in the time thereafter is assumed. That is, the slots are arranged in a continuous time domain that starts from earlier beacon signal transmission within a beacon interval. This is to efficiently allocate the slots. However, this form is just an example, and it does not matter if the slots of the individual nodes are arranged at discrete positions within the beacon interval. A period of a set of the allocation slots of the individual nodes that are arranged continuously from the transmission of the beacon signal of the data channel or discretely in this way is called "TDMA time slot allocation timing period". For example, timing charts of the data channel and the control channel are illustrated in FIG. 6 and FIG. 7 or the like described later, continuous allocation is assumed in these charts, and an area surrounded by a broken line, which starts immediately after the transmission of the beacon signal indicated by "B" in the data channel corresponds to the TDMA time slot allocation timing period. Then, a period not surrounded by the broken line until the next beacon signal after the end of the TDMA time slot allocation timing period is a period in which the slots are not allocated.

Figure 4:
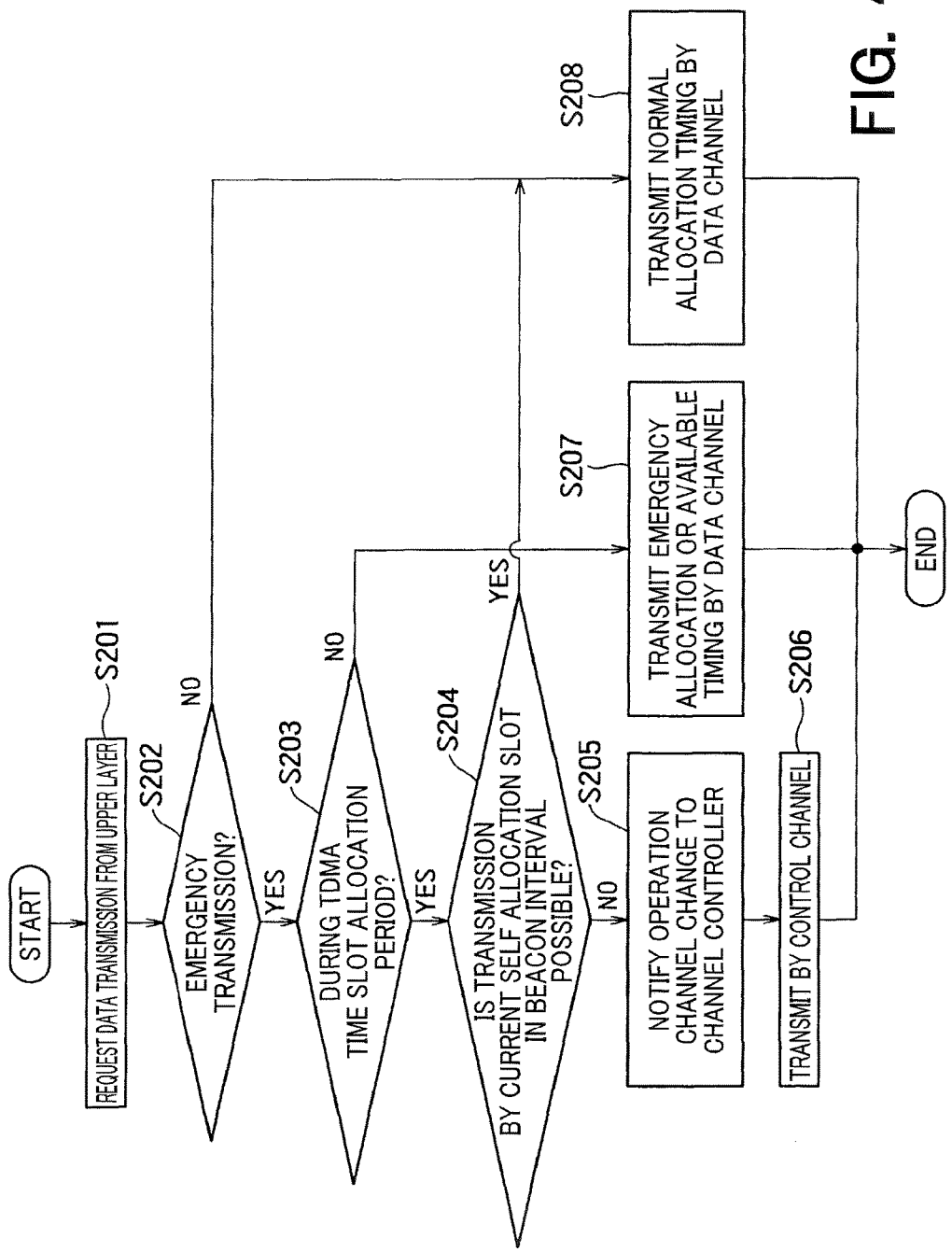
FIG. 4 is a flowchart of processing relating to an embodiment 2.

FIG. 4 illustrates an operation flow of the node relating to the embodiment 2.

Similarly to the embodiment 1, when the data frame is inputted from the upper layer processor 140, the transmission buffer 135 performs the queue management of the data frame according to the data type, and notifies the transmission request and the data type of the data frame to the access controller 133 (S201).

The access controller 133 determines whether or not it is needed to urgently transmit the data frame on the basis of the data type, similarly to the embodiment 1 (S202). In the case of determining that the emergency transmission is not needed, the access controller 133 determines to transmit the data frame by the allocation slot of the data channel as usual. The data frame is managed in the transmission buffer 135, outputted from the transmission buffer 135 at the timing according to the QoS control, and transmitted by its self allocation slot of the data channel (S208).

On the other hand, in the case of determining that the emergency transmission is needed, whether to perform the transmission through the data channel or the control channel is determined on the basis of a slot allocation status of the data channel (S202, S203, S204).

As one example, it is determined whether the timing of a time point at which it is determined that the emergency transmission is needed, that is, a time point at which it is detected that the data frame requested to be transmitted includes the emergency data (emergency data detection time point), is included in the TDMA time slot allocation timing period (S203). For this, information with which the number of the allocated slots or an allocated time length can be recognized is inserted (for example, a field of a number of allocation slots or the like) to the beacon signal transmitted from the hub through the data channel, and the allocation status at the present point of time can be recognized from the information and elapsed time from the beacon signal of the data channel received immediately before. In the case that the emergency data detection time point is included in the TDMA time slot allocation timing period (YES in S203), further, it is determined whether or not the transmission by its self allocation slot within the TDMA time slot allocation timing period can be made even when the transmission operation is started from then (S204). In the case that it cannot be made, it is determined to perform the transmission through the control channel, and the access controller 133 instructs the channel controller 134 to change the operation channel to the control channel (S205). Thus, the emergency data frame is transmitted through the control channel (S206).

In the case that the emergency data detection time point is included in the TDMA time slot allocation timing period but the transmission by its self allocation time slot can be made (YES in S204), it is determined to transmit the data frame by the allocation slot of the data channel. In this case, the data frame is transmitted by its self allocation slot of the data channel (S208). In this case, the emergency data frame is transmitted preferentially over the other data frames inside the transmission buffer.

In the case that the emergency data detection time point is not included in the TDMA time slot allocation timing period (NO in S203), that is, in the case that the TDMA time slot allocation timing period has already elapsed within the beacon interval, it is determined to perform the transmission by an available data channel (S207). This is because that, since the allocation slots of the individual nodes are arranged within the time that continues from the transmission of the beacon signal in the present embodiment as described above, when the slots are not allocated to the data channel at the emergency data detection time point, it can be determined that the slots are available until the next beacon signal in the data channel. In this case, the data frame is transmitted by the available slot that can be transmitted the earliest or the next or succeeding available slot (S207). In this case, the data frame may be transmitted directly by the slot without requesting the allocation of the slot or the like to the hub beforehand. Or, as a different method, allocation request processing of the data channel slot for the emergency data may be newly performed with the hub using the control channel, and the transmission may be performed using the allocated slot.

In the present processing flow, in the case that the transmission by its self allocation slot of the data channel can be made in step S204, the emergency data frame is transmitted by its self allocation slot. As a modification thereof, in the case that the time from the emergency data detection time point to arrival of its self allocation slot needs to be fixed time or longer, exceptionally the transmission may be performed instantaneously not by its self allocation slot but through the control channel.

Also, in the present processing flow, in the case that the emergency data detection time point is included in the TDMA time slot allocation timing period and the transmission by its self allocation slot cannot be made, the transmission is performed through the control channel. As a modification thereof, in the case that the emergency data detection time point is close to the end of the allocation timing period and it is determined that the transmission by the available data channel is possible within the fixed time from the emergency data detection time point, the transmission may be performed by the available slot of the data channel.

As described above, the wireless communication device relating to the embodiment 2 can select the channel with which the transmission can be performed more quickly, depending on the slot allocation status of the data channel at the emergency data detection time point.

Embodiment 3

The first and second embodiments illustrate the case of selecting either one of the control channel and the data channel when the emergency data is detected and transmitting the emergency data frame. On the other hand, in the present embodiment, when the emergency data is detected, the emergency data frame is transmitted by both channels. A block diagram of the node in the present embodiment is similar to that of the embodiment 1. Therefore, the description will be given hereinafter based on the block diagram in FIG. 3B used in describing the embodiment 1. It is assumed that the TDMA scheme is used in the data channel and the CSMA scheme is used in the control channel in the present embodiment as well. In the present embodiment, the operation of the access controller 133 is different from that in the embodiments 1 and 2. The description of the operations that overlap with the embodiments 1 and 2 will be omitted.

Figure 5:
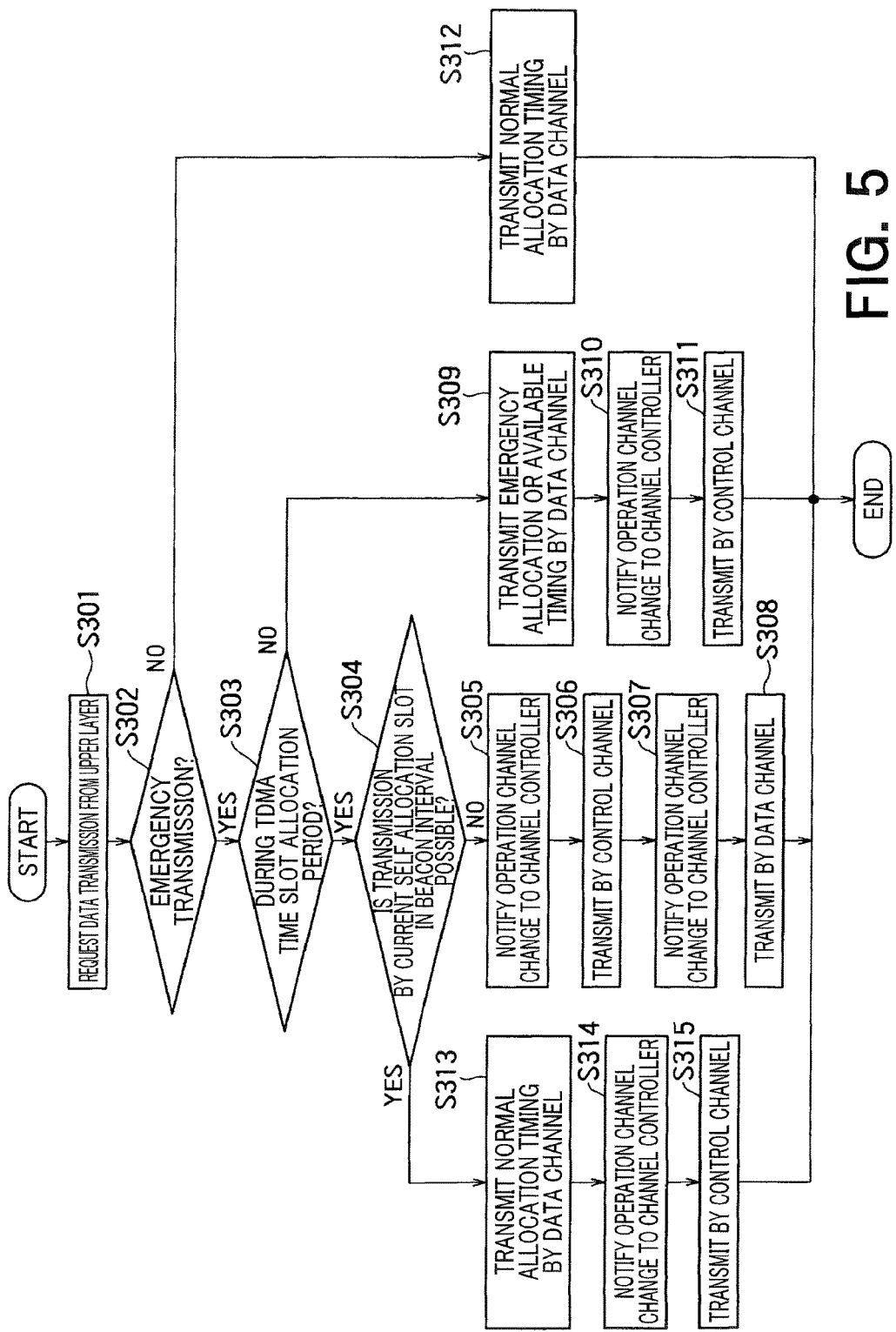
FIG. 5 is a flowchart of processing relating to an embodiment 3.

FIG. 5 illustrates a processing flow relating to the present embodiment 3.

Similarly to the embodiments 1 and 2, it is the same as in FIG. 4 that the data frame is inputted from the upper layer processor 140 to the transmission buffer 135, and the access controller 133 determines whether to urgently transmit the data frame on the basis of notification of the transmission request and the data type from the transmission buffer 135 (S301, S302). In the case that the emergency transmission is not needed, similarly to the embodiment 2, the data frame is transmitted by its self allocation slot of the data channel as usual (S312).

In the case that the emergency transmission is needed, that is, in the case that the data frame is the emergency data frame, the processing is as follows.

Similarly to the embodiment 2, whether the emergency data detection time point is included in the TDMA time slot allocation timing period is determined (S303). In the case that it is included in the allocation timing period, further, it is determined whether the transmission by its self allocation slot within the timing period can be made even when the transmission operation is started from then (S304). In the case that it cannot be made, it is determined to perform the transmission through the control channel. In this case, the access controller 133 instructs the channel controller 134 to change the operation channel to the control channel (S305), and the emergency data frame is transmitted through the control channel (S306). Further, thereafter, in the present embodiment, the data frame including the same data as the emergency data frame is transmitted also through the data channel. That is, after the end of the allocation timing period, the data frame is transmitted at the timing of the available slot of the data channel. Therefore, the access controller 133 instructs the channel controller 134 to change the operation channel to the data channel, and the channel controller 134 switches to the data channel (S307). The access controller 133 instructs the transmission processor 131 to transmit the data frame at the timing according to the available slot, and the transmission processor 131 performs the MAC processing of the data frame and transmits it from the transmitter 121 through the data channel.

On the other hand, in the case that the emergency data detection time point is included in the TDMA time slot allocation timing period but the transmission by its self allocation slot can be made (YES in S304), it is determined to transmit the data frame by the allocation slot of the data channel. In this case, the data frame is transmitted by its self allocation slot of the data channel (S313). That is, the emergency data frame is transmitted preferentially over the other data frames inside the transmission buffer. Further, thereafter, the data frame including the same data as the emergency data frame is transmitted also through the control channel. That is, the access controller 133 instructs the channel controller 134 to change the operation channel to the control channel, and the channel controller 134 changes the setting of the PHY&RF unit 120 to the control channel (S314). The access controller 133 instructs the transmission processor 131 to transmit the data frame, and the transmission processor 131 performs the MAC processing and transmits the processed frame from the transmitter 121 through the control channel (S315).

In the case that the emergency data detection time point is not included in the TDMA time slot allocation timing period (NO in S303), that is, in the case that the timing period has passed, similarly to the embodiment 2, it is determined to perform the transmission through the available data channel. In this case, the data frame is transmitted by the available slot that can be transmitted the earliest or the next or succeeding available slot (S309). In this case, the data frame may be transmitted directly by the slot without requesting the allocation of the slot or the like to the hub beforehand. Or, as a different method, allocation processing of the data channel slot for the emergency data may be newly performed with the hub using the control channel, and the transmission may be performed using the allocated slot. In the present embodiment, further thereafter, the operation channel is changed to the control channel, and the data frame including the same data as the emergency data frame is transmitted also through the control channel. That is, the access controller 133 instructs the channel controller 134 to change the operation channel to the control channel, and the channel controller 134 changes the setting of the PHY&RF unit 120 to the control channel (S310). The access controller 133 instructs the transmission processor 131 to transmit the data frame, the transmission processor 131 performs the MAC processing and outputs the processed frame to the transmitter 121, and the transmitter 121 transmits the frame through the control channel through the antenna 110 (S311).

In steps S309-S311, after the transmission is performed by the available slot of the data channel, the transmission is performed through the control channel, however, as a modification, the transmission may be performed by the available slot of the data channel after the transmission is performed through the control channel. Also, the transmission through the data channel and the transmission through the control channel may partially overlap in terms of the time. For example, in the case that the node has the plurality of antennas, such an operation is possible.

Here, in steps S309-S311, the data frame is transmitted by both of the data channel and the control channel, and it is because it is possible that the other hub and the other scheme are using the same channel as the data channel and a collision may occur even when the available slot is selected at the time. Also, the case that the status of the data channel is bad is possible. Therefore, even in the case that there is the available slot in the data channel, the transmission is performed also through the control channel after the transmission through the data channel. Note that, in the case of the status that there is no risk of a collision or the like in the data channel and it can be determined that reliability is high, the transmission may be performed only through the data channel.

Figure 8:
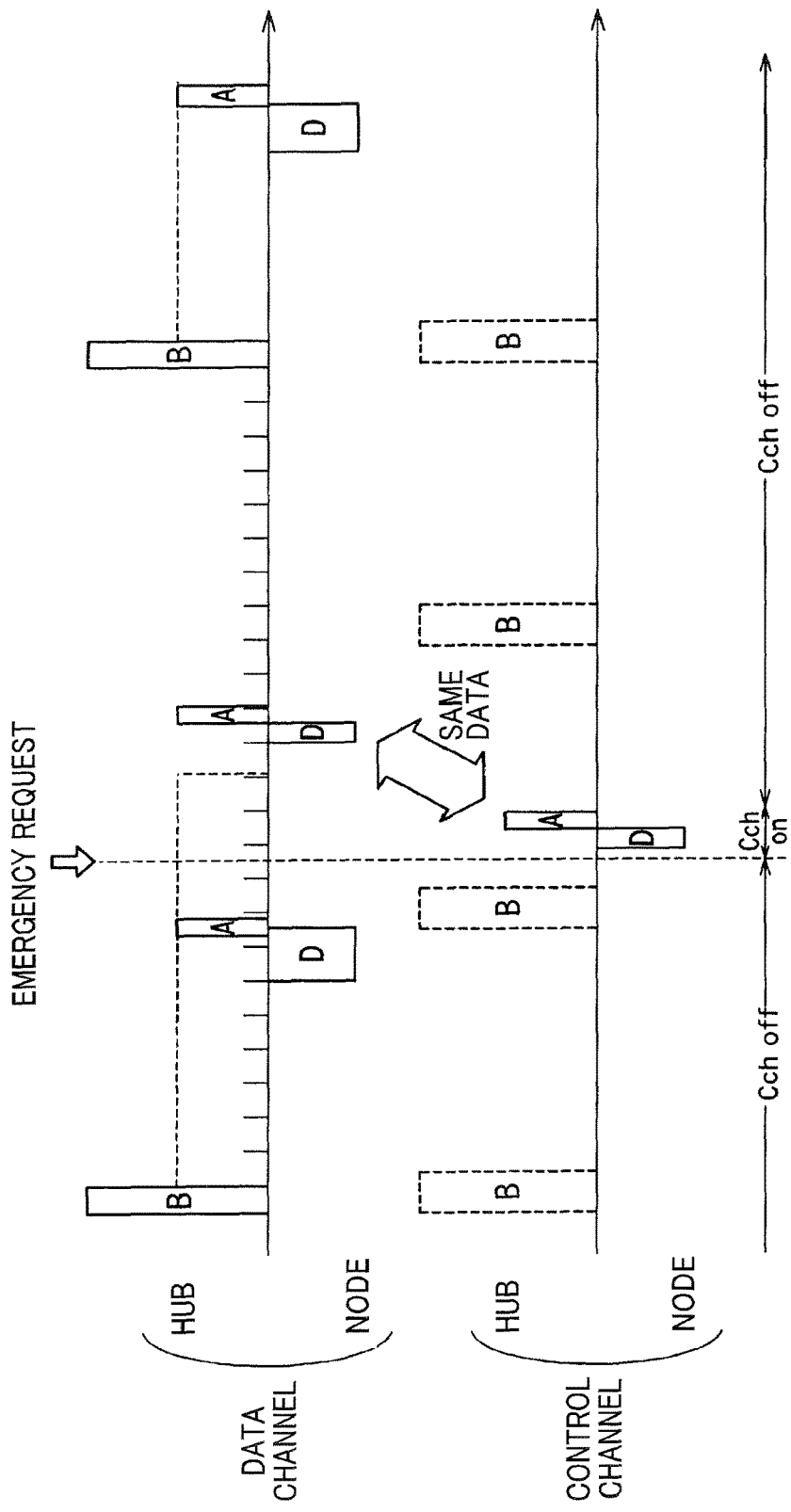
FIG. 8 is a timing chart of the emergency allocation node relating to the embodiment 3.

FIG. 6 to FIG. 8 illustrate the timing charts of the node where the emergency data is generated (emergency data generation node) and the hub relating to the present embodiment. FIG. 6 illustrates the timing chart of a first example of the processing of steps S309-S311 in FIG. 5, FIG. 7 illustrates the timing chart of a second example of the processing of steps S309-S311 in FIG. 5, and FIG. 8 illustrates the timing chart in the case of performing the processing of steps S305-S308. In each chart, a horizontal axis indicates the time.

A vertically long rectangle indicates a signal. A horizontal width of the rectangle corresponds to transmission time or a signal size of the signal.

The signal of the rectangle where "B" is written indicates the beacon signal, the signal of the rectangle where "D" is written indicates a data frame signal, and the signal of the rectangle where "A" is written indicates an ACK signal. "Dch" indicates the data channel, and "Cch" indicates the control channel. The horizontally long broken line rectangle indicates the time slot allocation period.

In FIG. 6, since the time of detecting the emergency data is not during the TDMA time slot allocation timing period, the emergency data frame is transmitted first through the control channel and the frame of the same data is transmitted utilizing the available slot of the data channel after the transmission. In the flow (S309-S311) in FIG. 5, the case of performing the transmission through the control channel after the transmission through the data channel is a basic flow, however, it is described that the order may be reversed. FIG. 6 illustrates the processing in the case of the reverse. In the example illustrated in FIG. 6, after the transmission through the control channel is started, the transmission is started also through the data channel in parallel to it so that they overlap in terms of the time. Note that the data channel of the node is activated at all times, and on the other hand, the control channel is activated only when needed and is set to be stopped otherwise. "Cch on" indicates that the control channel is activated, and "Cch off" indicates that the control channel is stopped. It is assumed that both of the data channel and the control channel are activated at all times on a hub side.

In FIG. 7, since the time of detecting the emergency data is not during the slot allocation timing period, the emergency data frame is transmitted utilizing the available slot of the data channel after the lapse of the allocation timing period, and the same data frame is transmitted through the control channel thereafter. With the end of the transmission through the data channel as a trigger, the control channel is activated, and the frame including the same data is transmitted. When the transmission through the control channel is completed, the operation of the control channel is stopped.

In the example illustrated in FIG. 7, since the transmission through the control channel is performed after the transmission and reception through the data channel are completed, the operations of the control channel and the data channel do not overlap, and there is an advantage that processing loads are lower than that in the example illustrated in FIG. 6.

In FIG. 8, since the time of detecting the emergency data is during the slot allocation timing period, the emergency data frame is transmitted through the control channel first. Then, after the transmission, the frame of the same data is transmitted utilizing the available slot of the data channel after the lapse of the allocation timing period.

As described above, in the embodiment 3, in the case of the emergency data, by transmitting the same data according to the respective access schemes in both of the control channel and the data channel, the emergency data can be more surely transmitted.

Embodiment 4

In the present embodiment, a method of determining by which of the data channel and the control channel the emergency data frame is to be transmitted in consideration of a size of the emergency data frame will be described.

As the emergency data, alarm information sensed by the sensor and data itself acquired by the sensor are conceivable. It is conceivable that, between these two pieces of the data, there is a big difference in the data size. On the other hand, in the case of performing the transmission using the available slot of the data channel without requesting the allocation beforehand, it is not preferable that influence by that is exerted to the other nodes or the like. For example, when it is only the alarm information, since it is conceivable that an information amount is small and it is settled within the available slot when the slot is available, even when the slot is used without requesting the allocation beforehand or the like, it is conceivable that the influence on the other nodes or the like is absent or is small even if there is any. In the present embodiment, these points are taken into consideration.

In the embodiments 1-3, in the case of performing the transmission by the available slot of the data channel, (A) the transmission is performed by directly using the available slot, or (B) the slot is allocated by exchanging the allocation request/allocation response for the emergency data and the transmission is performed using the allocated slot. In the present embodiment 4, in addition to use of one of (A) and (B) described above, the determination is made in consideration of the size of the emergency data frame as well.

Figure 9:
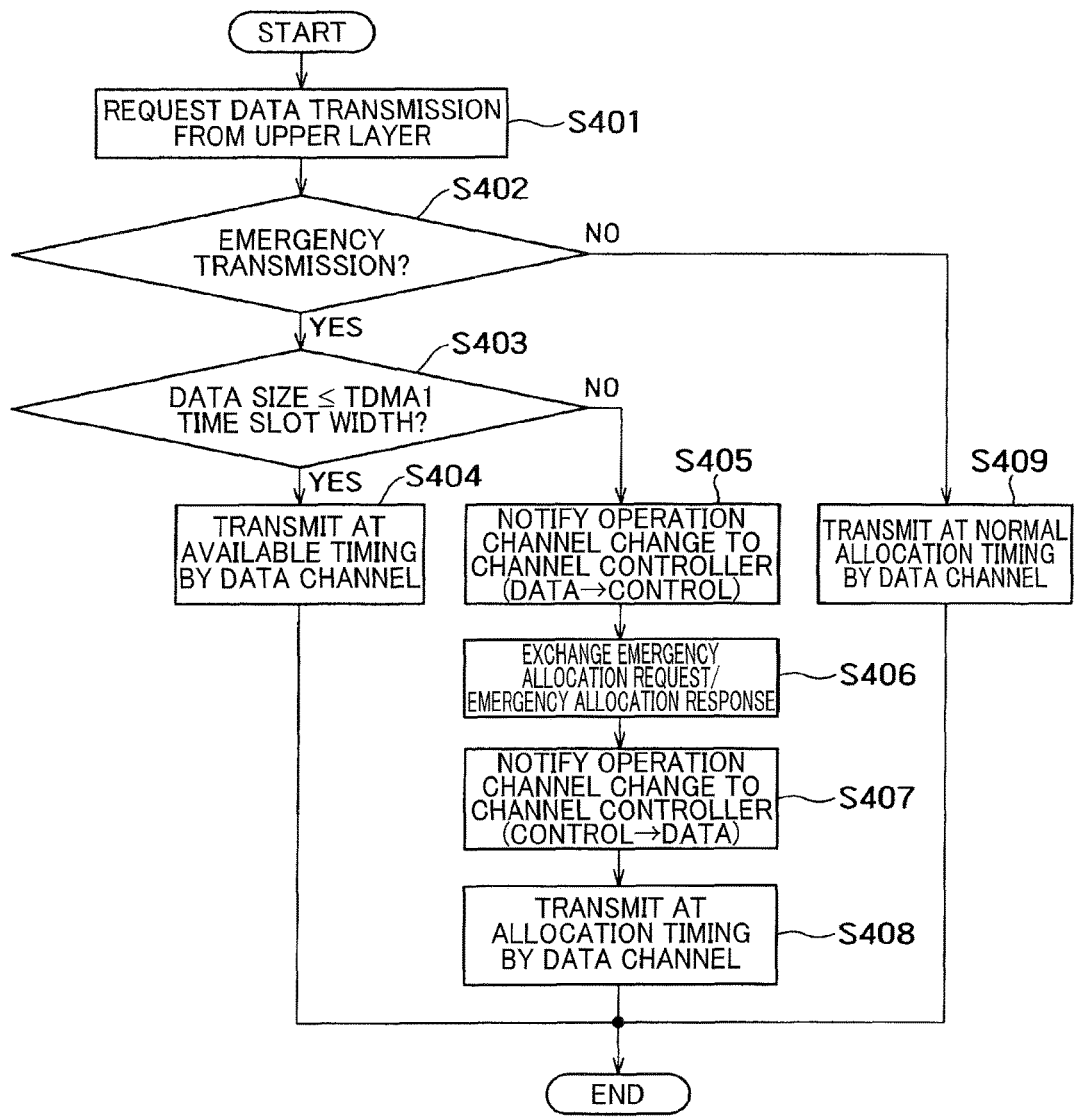
FIG. 9 is a flowchart of processing relating to an embodiment 4.

FIG. 9 illustrates a processing flow relating to the embodiment 4.

Since steps S401, S402 and S409 are the same as S301, S302 and S312 in FIG. 5, the description will be omitted.

In step S403, it is determined whether the transmission time determined from the size of the emergency data frame (or the size of an emergency data main body included in the frame. The same applies hereinafter) is settled in one slot of TDMA. In the case that it is settled (YES in S403), the transmission is performed as it is by the available slot after the lapse of the allocation timing period (S404). That is, the emergency data frame is transmitted by the available slot without requesting the allocation of the slot beforehand.

On the other hand, in the case of determining that the transmission time determined from the emergency data frame is not settled in one slot (NO in S403), the operation channel is switched to the control channel (S405), and an emergency allocation request signal is transmitted and an emergency allocation response signal is received through the control channel (S406). When the exchange of the request signal and the response signal is ended, the operation channel is switched to the data channel (S407), and the allocation slot is specified based on the allocation information included in the response signal. Then, the emergency data frame is transmitted through the data channel at the timing of the slot (S408).

In the example described in FIG. 9, whether the size of the emergency data frame is settled in one slot length of a TDMA frame is a determination standard, however, as a different example, a period to the next beacon signal of the data channel may be taken into consideration, and when data transmission does not overlap with the next beacon signal, it may be determined to perform the transmission by the available slot of the data channel similarly to the processing of step S404. On the other hand, when the data transmission overlaps with the next beacon signal, the slot is secured and the transmission is performed similarly to the processing of steps S405-S408. Or, the data is transmitted through the control channel similarly to S205-S206 in FIG. 4.

In the above-described example illustrated in FIG. 9, whether to perform the processing (S404) or to perform the processing (S405-S409) is determined based only on the size of the emergency data frame, however, it does not matter if the slot allocation status of the data channel is additionally taken into consideration similarly to the embodiments 2 and 3.

Figure 10:
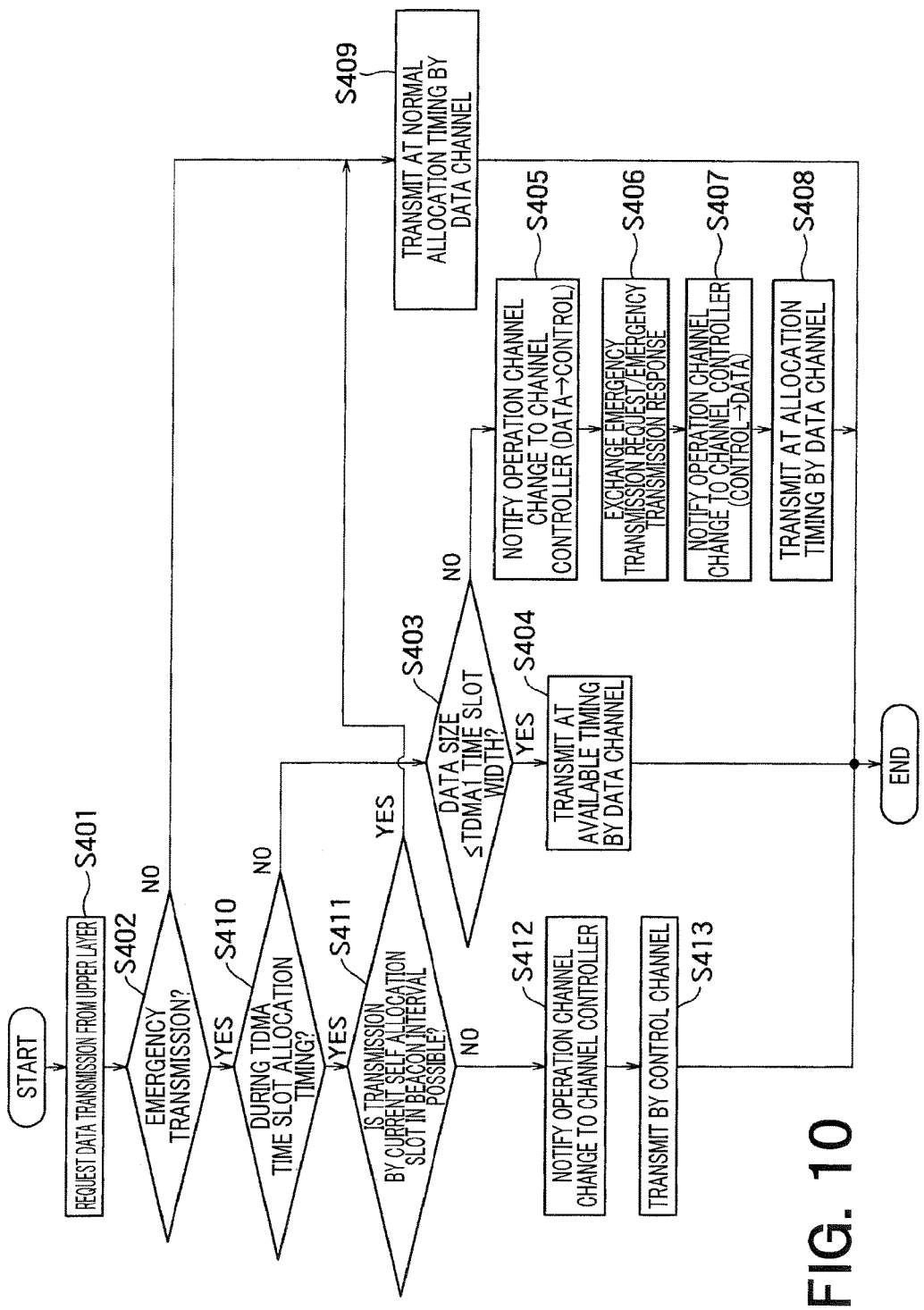
FIG. 10 is a flowchart of other processing relating to the embodiment 4.

FIG. 10 illustrates a processing flow for which a determination step based on the allocation status of the data channel is added to the processing flow in FIG. 9. To steps S401-S409 in FIG. 9, steps S410, S411 and S412 are added. Steps S410, S411, S412 and S413 are the same as S203, S204, S205 and S206 in FIG. 4.

In the case of determining that the emergency transmission is to be performed in the processing of step S402, whether or not it is during the time slot allocation timing period is determined (S410), and in the case that it is during the allocation timing (YES in S410), the determination and the processing similar to that in steps S204-S206 and S208 in FIG. 4 are performed (S411, S412, S413 and S409). In the case that it is not during the allocation timing (NO in S410), it is similar to FIG. 9 (S403-S408).

Figure 11:
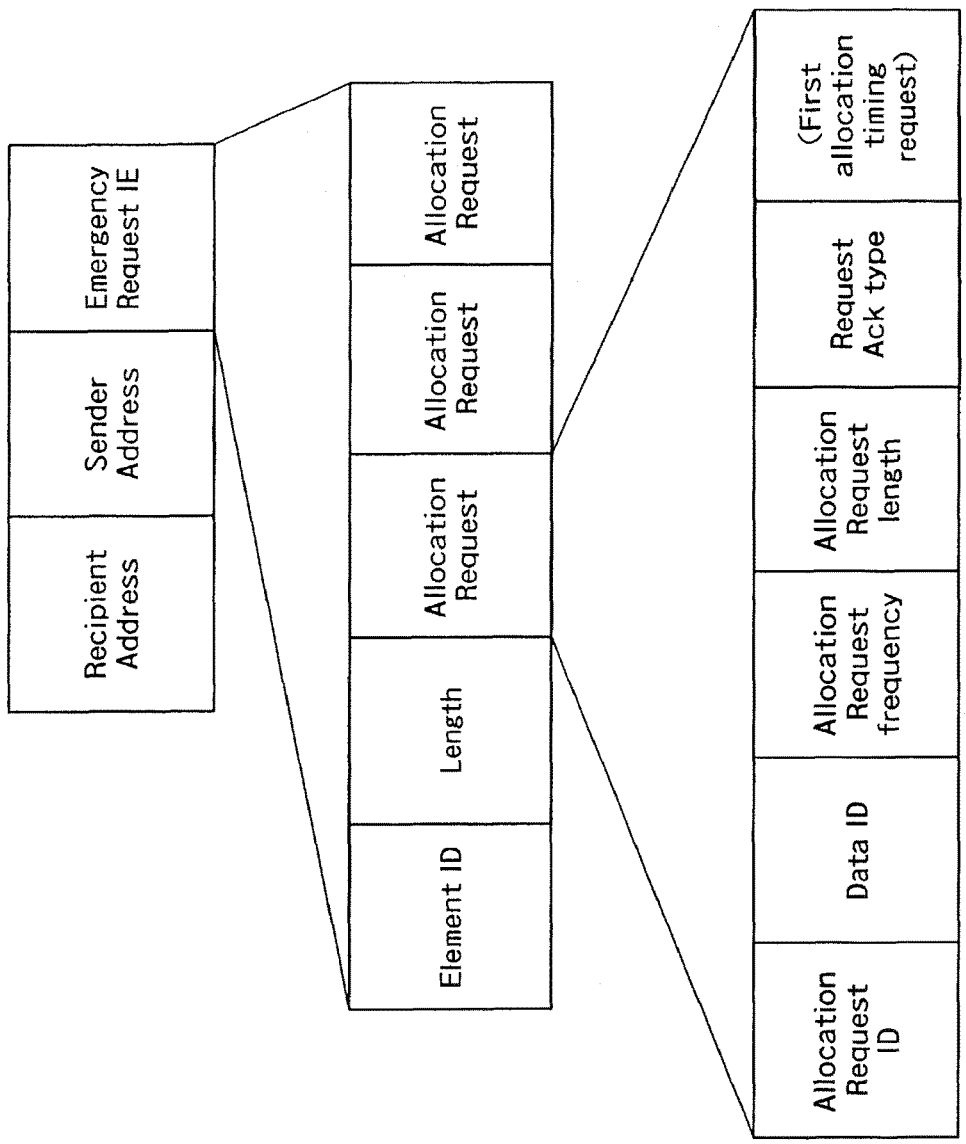
FIG. 11 is a diagram illustrating a frame configuration example of an emergency allocation request used in the embodiment 4.

FIG. 11 illustrates a frame configuration example of the emergency allocation request signal relating to the present embodiment. The figure illustrates one example, and it does not matter if an order of fields within the frame is changed, some fields do not exist, or a field is newly added.

The emergency allocation request includes addresses of the hub and the node, an allocation time length (slot length) for the emergency data, and the frequency information or the like. The allocation time length is described in an "allocation request length" field, and an allocation frequency is described in an "allocation request frequency" field. For the allocation time length, the transmission time determined from the size of the emergency data frame (or the emergency data main body), or a value for which the time to the response signal reception is added to the transmission time is described. For the allocation frequency, for example, in how many cycles of the beacon signal of the data channel the allocation is performed once is described. In the case of single emergency data for which the emergency data is transmitted only once, the description of the allocation frequency is not necessary, and the field may be eliminated or it may be indicated that it is single by describing the frequency "1".

Figure 12:
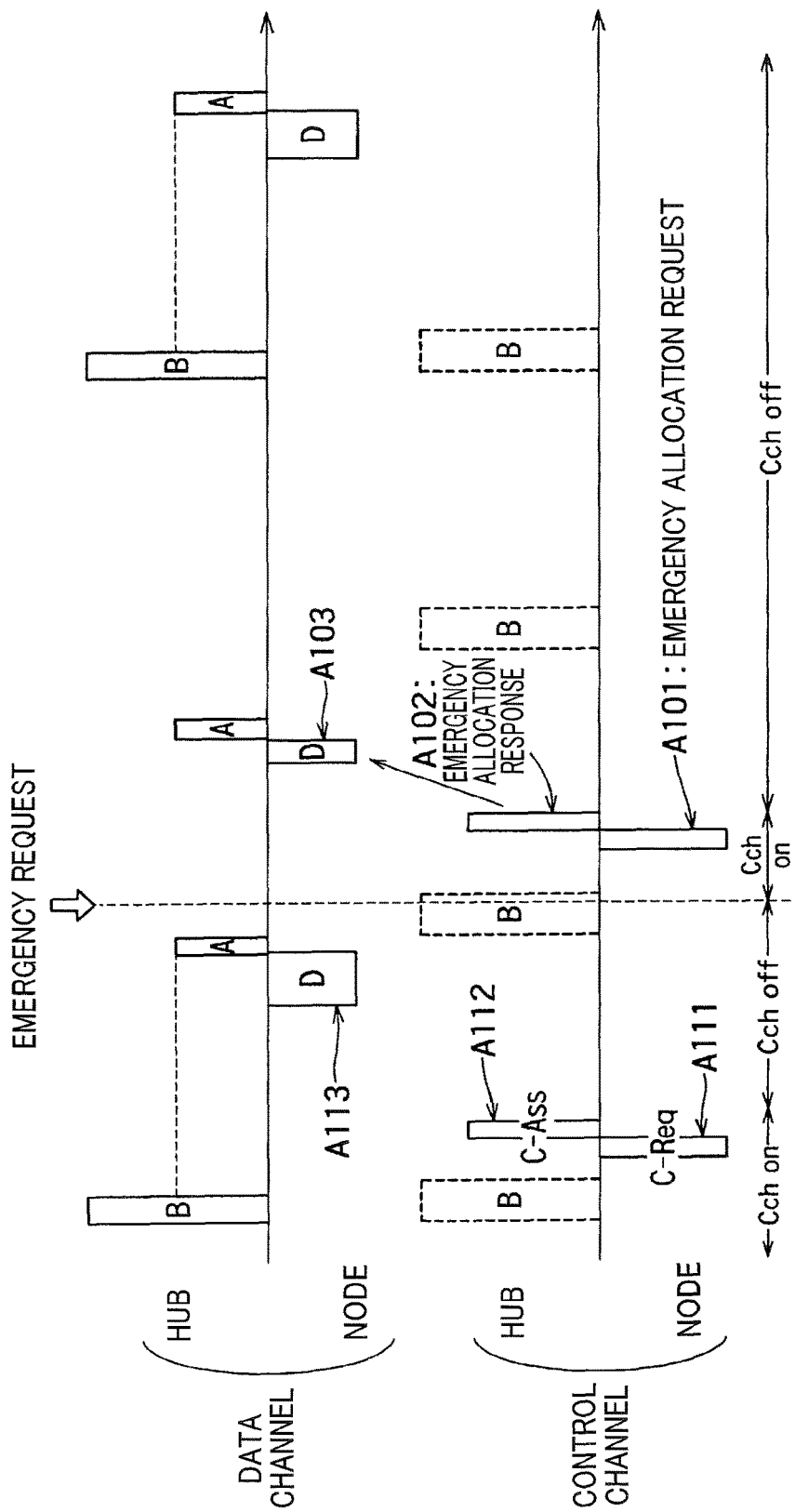
FIG. 12 is a timing chart of a node illustrating exchange of the emergency allocation request and a response.

FIG. 12 illustrates a timing chart of the node and the hub that exchange the emergency allocation request signal and the emergency allocation response signal.

When the emergency data is detected (an emergency request is generated) and it is determined that the emergency allocation request and response are to be exchanged, the node activates the control channel, and transmits the emergency allocation request (Emergency Request) through the control channel (A101). When the emergency allocation response (Emergency Response) is received from the hub (A102), the node uses allocation information (the allocation slot and the allocation frequency) described in the emergency allocation response, and transmits the emergency data frame through the data channel (A103). The node stops the control channel with the reception of the emergency allocation response from the hub as a trigger. In the example illustrated in FIG. 12, the case of the single emergency data for which the emergency data is transmitted only once (the case of the frequency "1") is illustrated, however, the periodical allocation of the slots at a certain frequency may be requested by the emergency allocation request and the slot for the emergency data may be periodically secured.

Note that "C-Req" and "C-Ass" indicated in FIG. 12 indicate (non-urgent) connection request and connection response. When requesting the allocation of the slot of the data channel, the node usually receives the slot allocation for data frame transmission indicated in the connection response by sending the connection request to the hub (A111) and receiving the connection response from the hub (A112). Thus, the node secures the slot of cyclic data transmission through the data channel, and the data frame can be transmitted by the slot (A113).

Note that, in the timing chart illustrated in FIG. 12, response signals such as ACK are not described for control signals such as the emergency allocation request signal and the emergency allocation response signal, however, it does not matter if the response signals to the individual control signals are actually returned.

Also, in the example illustrated in FIG. 12, the processing presupposing that the emergency allocation request signal and the emergency allocation response signal are exchanged through the control channel is illustrated, however, it does not matter if a configuration is such that, when the data channel is available, only the control signals related to the emergency allocation are transmitted and received through the data channel.

As described above, in the embodiment 4, in the case of the emergency data of a small size like an alarm, by transmitting it by the available slot without performing the slot allocation processing beforehand, the emergency data can be more easily transmitted. Also, in the case that the size of the emergency data is big and the possibility of exerting the influence on the other nodes is high, by securing the slot by performing the slot allocation processing beforehand, and performing the transmission by the secured slot, the influence on the other nodes can be reduced.

Embodiment 5

The embodiment 4 illustrates the example that the node transmits the emergency allocation request signal to the hub, the emergency allocation response signal is received from the hub, and the node transmits the emergency data through the data channel by the slot according to the allocation information included in the response signal.

An embodiment 5 introduces a mechanism that the node individually specifies the slot to transmit the emergency data from the available slots of the data channel and notifies it to the hub without exchanging the emergency allocation request and response. This is by the fact that, since the information with which the number of the allocated slots of TDMA or an allocated time length can be recognized (for example, the value of a "Number of allocation slots" field) is inserted at least to the beacon signal of the data channel, each node can recognize occupied slots and the available slots in the data channel of the hub to which it is connected. The node transmits a notification signal specifying the slot that is desired to be used to the hub, and after the transmission of the notification signal, tries data transmission by the notified slot. As a format of the notification signal, a format of the emergency allocation response signal can be used as one example.

Figure 13:
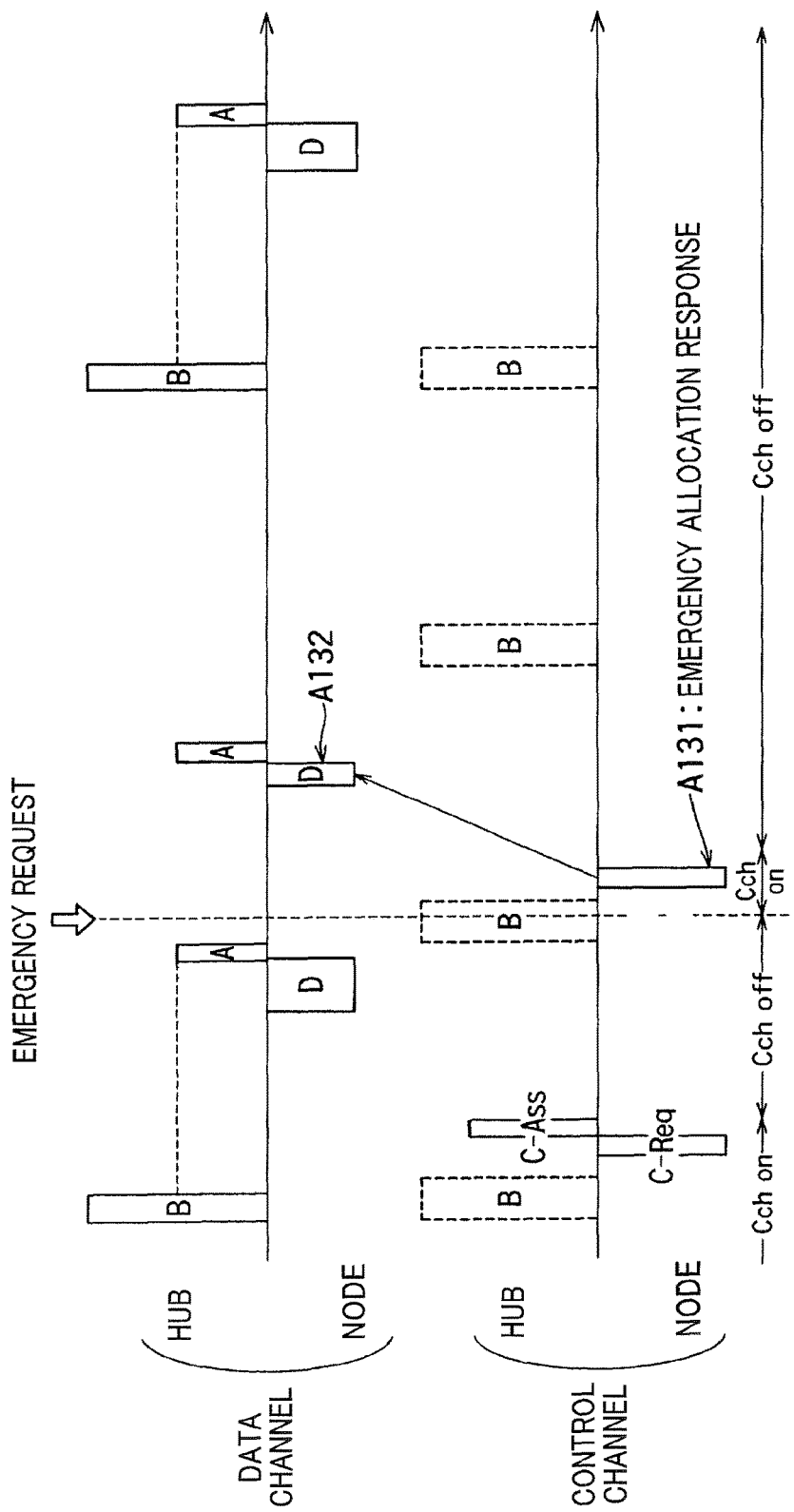
FIG. 13 is a timing chart of an emergency allocation node relating to an embodiment 5.

FIG. 13 illustrates a timing chart of the node and the hub relating to the present embodiment.

After the emergency data is detected, the node transmits the emergency allocation response signal including information specifying the slot that is desired to be used through the control channel (A131). Thereafter, the node transmits the emergency data frame by the specified slot (A132).

Note that, in the timing chart illustrated in FIG. 13, the response signals such as ACK are not described for the control signals such as the emergency allocation response signal, however, it does not matter if the response signals to the control signals are actually returned. Also, in the example illustrated in FIG. 13, the processing presupposing that the emergency allocation response signal is exchanged through the control channel is illustrated, however, it does not matter if the configuration is such that, when the data channel is available, only the control signals related to the emergency data are transmitted and received through the data channel.

As described above, in the embodiment 5, the node determines the slot for the emergency data frame transmission by itself, notifies it and transmits the emergency data frame by the notified slot, thereby more easily communicating with the hub.

Embodiment 6

In the embodiments 1-5, the control channel and the data channel use different frequencies on a frequency axis. On the other hand, an embodiment 6 describes the case of transmitting the emergency data frame in the case that both of the control channel and the data channel are operated in a time division manner on the same frequency channel, that is, one channel.

Figure 14:
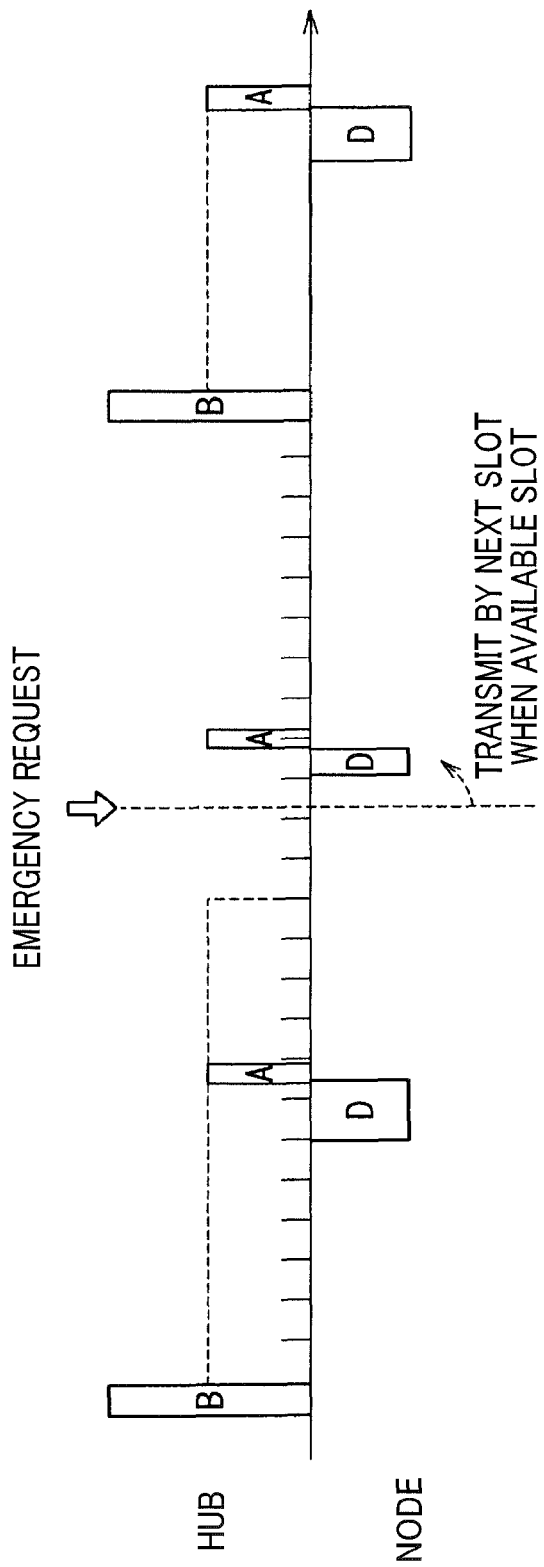
FIG. 14 is a timing chart of a node and a hub relating to an embodiment 6.
Figure 15:
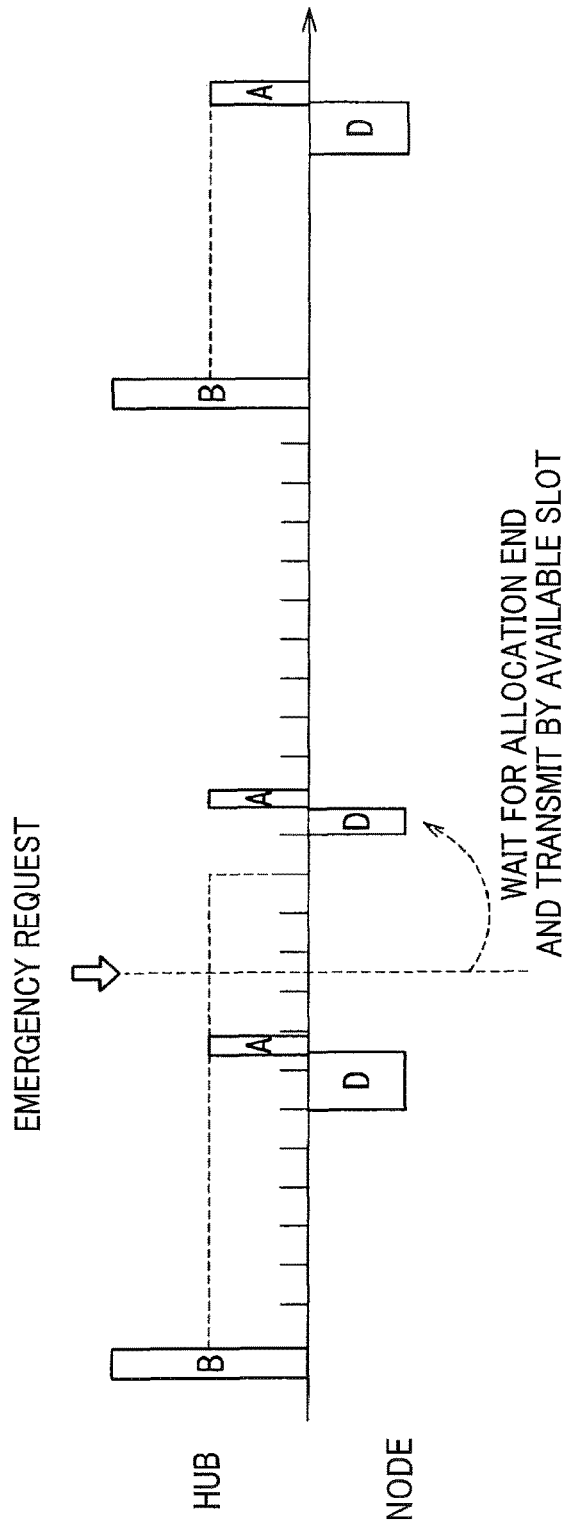
FIG. 15 is a timing chart of the node and the hub relating to the embodiment 6.
Figure 16:
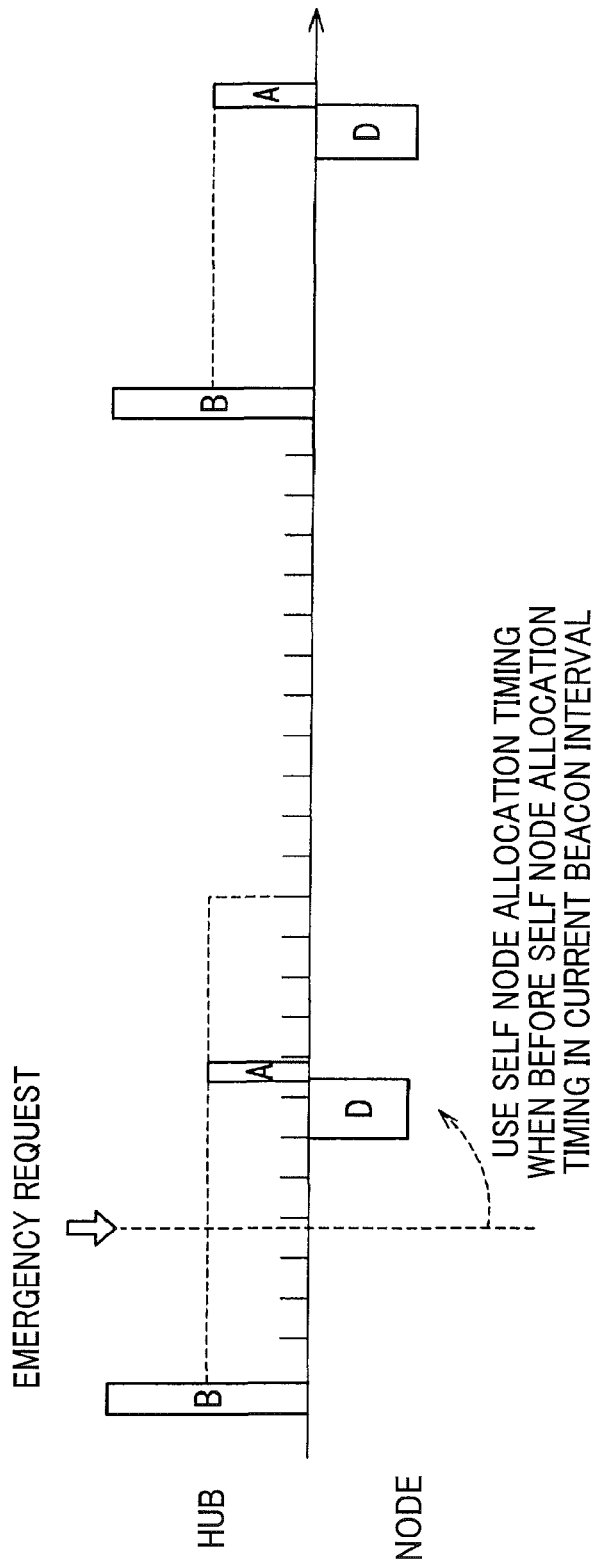
FIG. 16 is a timing chart of the node and the hub relating to the embodiment 6.

FIG. 14 to FIG. 16 illustrate timing charts of the node and the hub relating to the present embodiment 6. Note that, in FIG. 14 to FIG. 16, only the operation of the data channel is illustrated and the illustration of the operation of the control channel is omitted.

FIG. 14 illustrates the case that the time of detecting the emergency data is after the lapse of the TDMA time slot allocation timing period, and FIG. 15 and FIG. 16 illustrate the case that the time of detecting the emergency data is during the TDMA time slot allocation timing period, respectively.

As in FIG. 14, in the case that the time of detecting the emergency data is after the lapse of the allocation timing, the emergency data frame is transmitted by the slot that can be transmitted the earliest or the next or succeeding slot (provided that it is within a beacon interval).

On the other hand, as in FIG. 15, in the case that the time of detecting the emergency data is during the TDMA time slot allocation timing period and it is after the allocation slot for the own node in the present beacon interval or in the case that the transmission by the allocation slot for the own node cannot be made (for example in the case that the time to the allocation slot is equal to or shorter than a threshold), the transmission is performed by the available slot after the lapse of the slot allocation timing period. For example, the transmission is performed by the earliest slot that can be transmitted after the end of the TDMA time slot allocation timing period or the slot after that (provided that it is within the beacon interval).

Further, as in FIG. 16, in the case that the time of detecting the emergency data is during the TDMA time slot allocation timing period but the transmission by the allocation slot for the own node in the present beacon interval can be made, the emergency data frame is transmitted using the allocation slot for the own node.

In the processing illustrated in FIG. 14 to FIG. 16, the size of the emergency data is not taken into consideration, however, the processing in consideration of the size of the emergency data may be actually included in the processing of FIG. 14 to FIG. 16. For example, in the case of assuming that the data channel and the control channel are time-divided on the same frequency channel, depending on a data size, the emergency allocation request and the emergency allocation response may be exchanged during the time of the control channel, the slot allocation through the data channel may be received, and the transmission may be performed by the slot.

Embodiment 7

Figure 17:
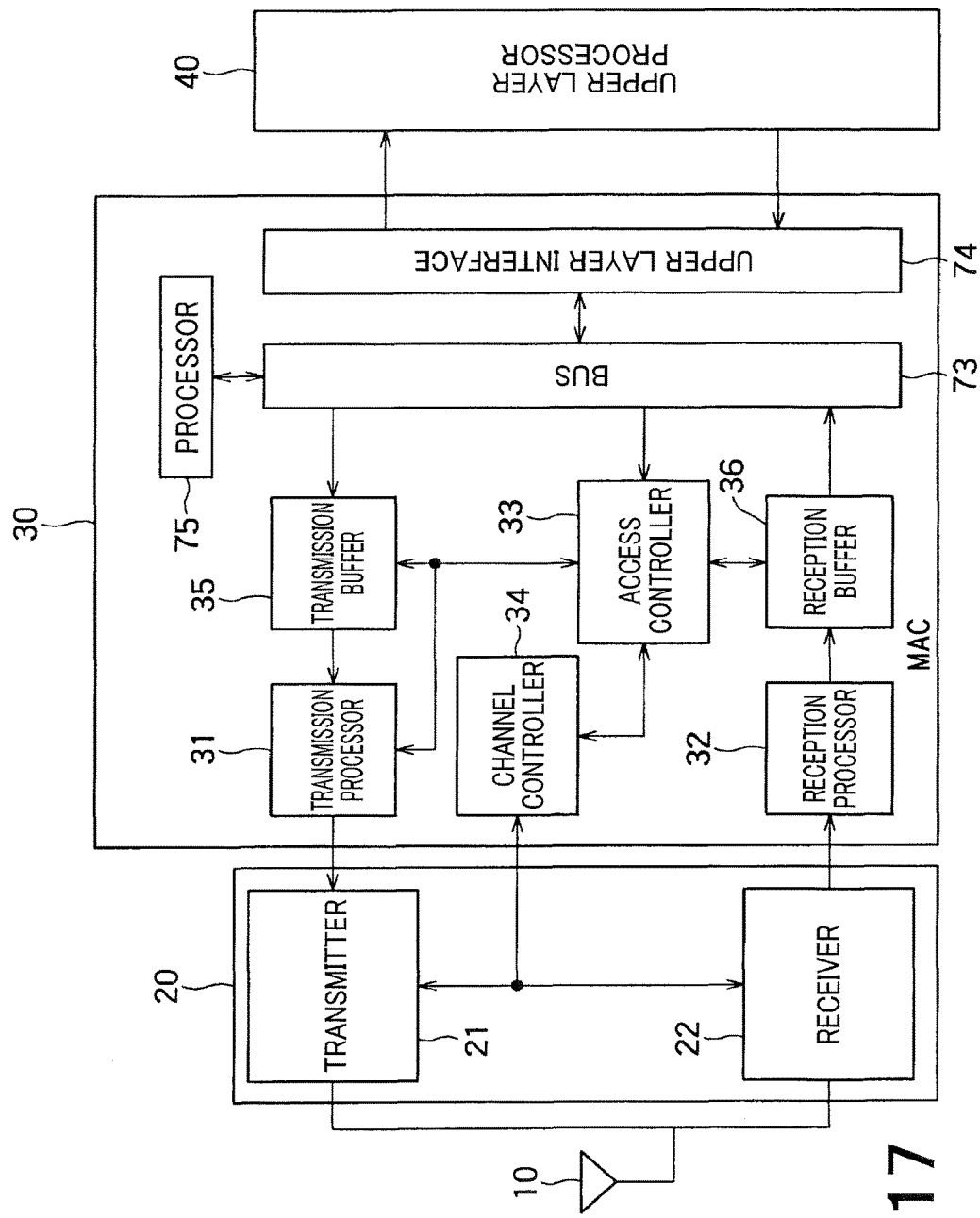
FIG. 17 is a block diagram of a wireless communication device in a hub relating to an embodiment 7.

FIG. 17 illustrates a block diagram of a wireless communication device in the hub relating to an embodiment 7.

The hub illustrated in FIG. 17 has a form that a bus 73 is connected to the buffers 35 and 36 and the access controller 33 in the embodiment 1 illustrated in FIG. 3A, and an upper layer interface 74 and a processor 75 are connected to the bus 73. The MAC unit 30 is connected with the upper layer processor 40 at the upper layer interface 74. In the processor 75, firmware is operated. By rewriting the firmware, functions of the wireless communication device can be easily changed. The function of at least one of the access controller 33 and the channel controller 34 may be achieved by the processor 75.

Figure 18:
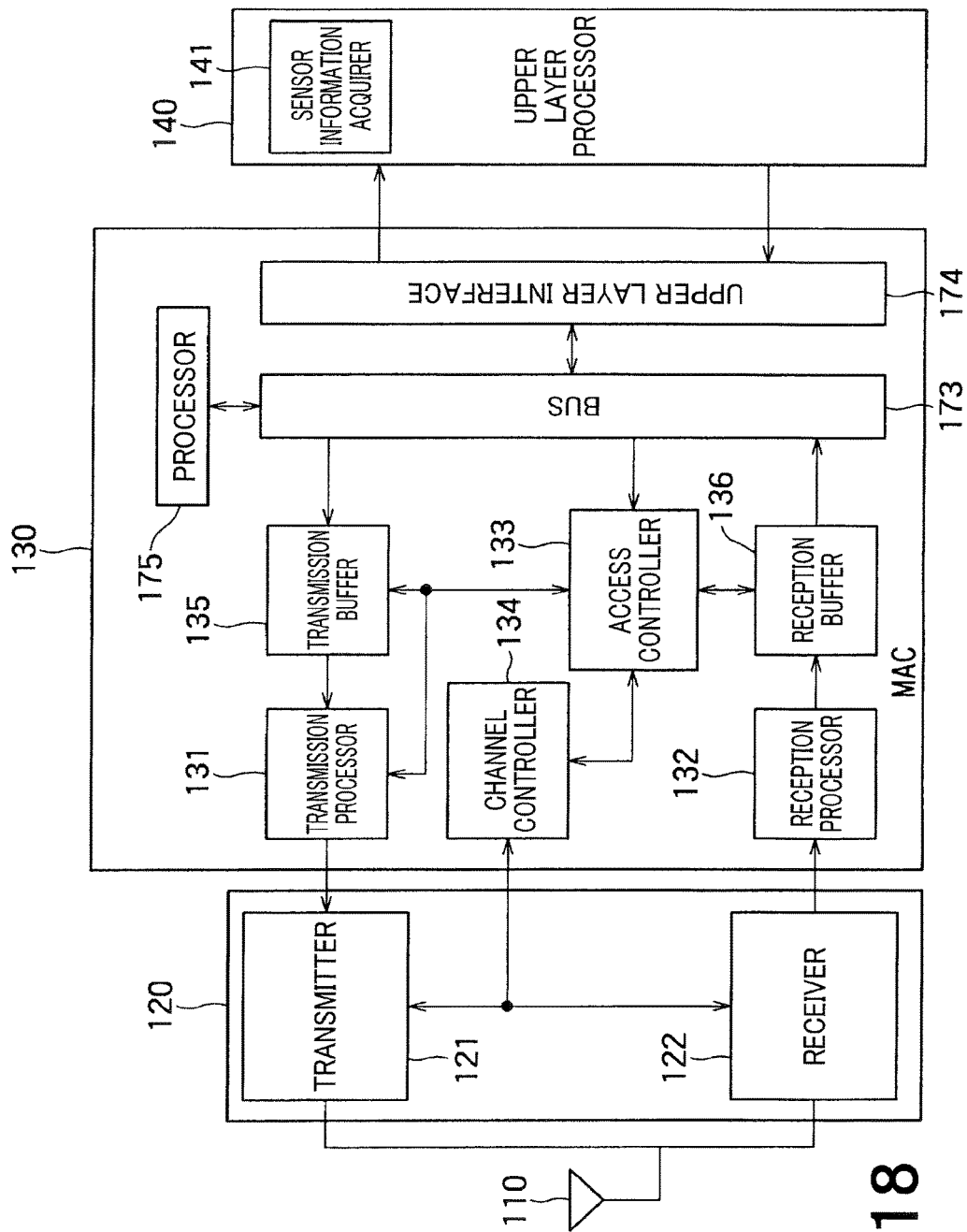
FIG. 18 is a block diagram of a wireless communication device in a node relating to the embodiment 7.

FIG. 18 illustrates a block diagram of a wireless communication device in the node relating to the embodiment 7.

The node illustrated in FIG. 18 has a form that a bus 173 is connected to the buffers 135 and 136 and the access controller 133 in the embodiment 1 illustrated in FIG. 3B, and a upper layer interface 174 and a processor 175 are connected to the bus 173. The MAC unit 130 is connected with the upper layer processor 140 at the upper layer interface 174. In the processor 175, the firmware is operated. By rewriting the firmware, functions of the wireless communication device can be easily changed. The function of at least one of the access controller 133 and the channel controller 134 may be achieved by the processor 175.

Embodiment 8

Figure 19:
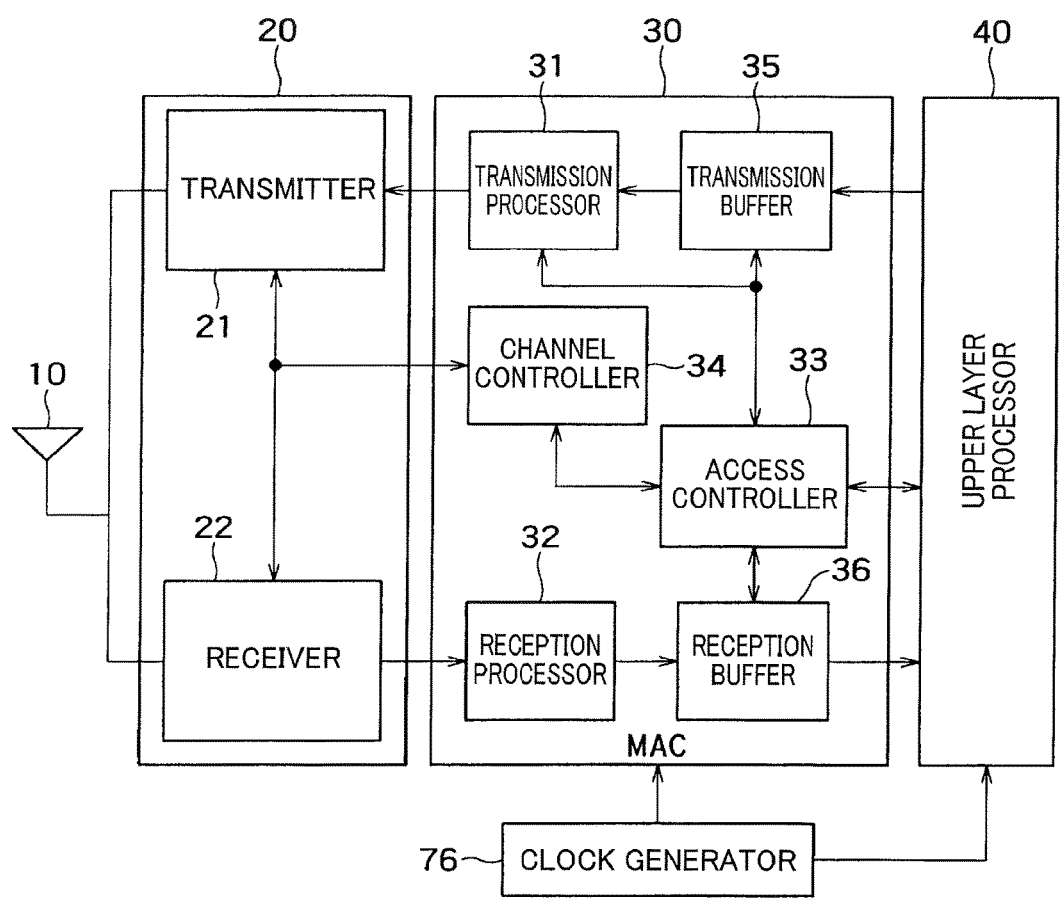
FIG. 19 is a block diagram of a wireless communication device in a hub relating to an embodiment 8.

FIG. 19 illustrates a block diagram of a wireless communication device in the hub relating to an embodiment 8.

The wireless communication device illustrated in FIG. 19 has a form that a clock generator 76 is connected to the MAC unit 30 in the hub relating to the embodiment 1 illustrated in FIG. 3A. The clock generator 76 is connected through an output terminal to an external host (the upper layer processor 40 here), and a clock generated by the clock generator 76 is given to the MAC unit 30 and is also outputted to the external host. By operating the host by the clock inputted from the clock generator 76, a host side and a wireless communication device side can be operated in synchronism. In this example, the clock generator 76 is arranged on the outer side of the MAC unit, however, it may be provided inside the MAC unit.

Figure 20:
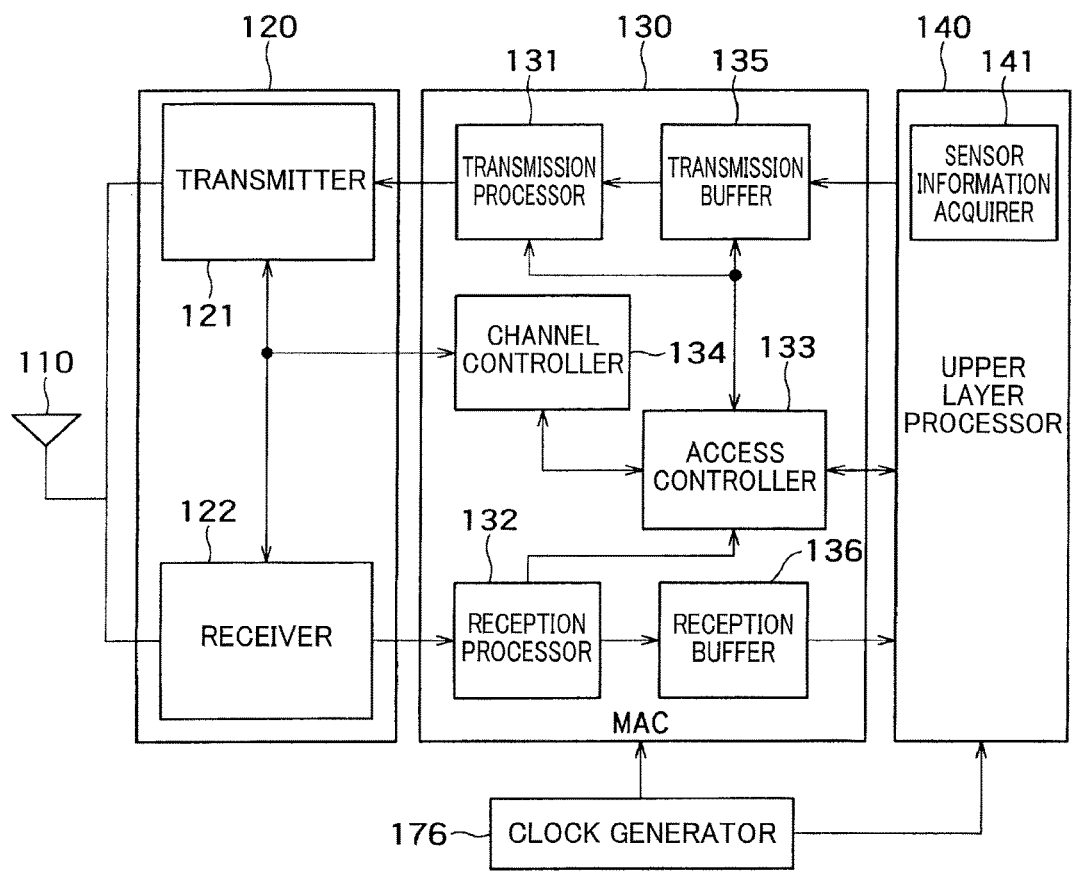
FIG. 20 is a block diagram of a wireless communication device in a node relating to the embodiment 8.

FIG. 20 illustrates a block diagram of a wireless communication device in the node relating to the embodiment 8.

The wireless communication device illustrated in FIG. 20 has a form that a clock generator 176 is connected to the MAC unit 130 in the node relating to the embodiment 1 illustrated in FIG. 3B. The clock generator 176 is connected through an output terminal to an external host (the upper layer processor 140 here), and a clock generated by the clock generator 176 is given to the MAC unit 130 and is also outputted to the external host. By operating the host by the clock inputted from the clock generator 176, the host side and the wireless communication device side can be operated in synchronism. In this example, the clock generator 176 is arranged on the outer side of the MAC unit, however, it may be provided inside the MAC unit.

Embodiment 9

Figure 21:
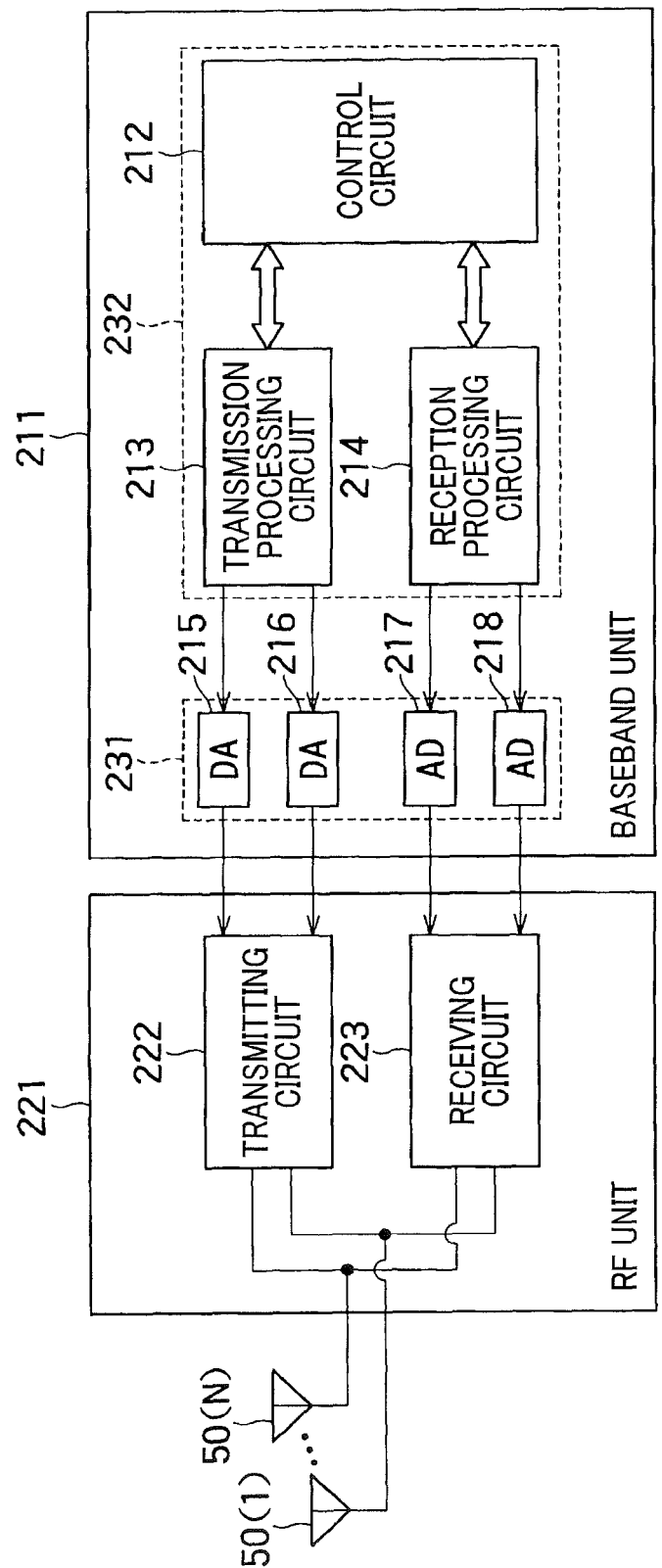
FIG. 21 is a hardware block diagram of a wireless communication device relating to an embodiment 9.

FIG. 21 illustrates an example of a hardware configuration of a wireless communication device in accordance with embodiment 9. This hardware configuration is only provided by way of example, and various modifications can be made to this hardware configuration. The operation of the wireless communication device illustrated in FIG. 21, detailed description of which is omitted, proceeds in the same or similar manner as in the wireless communication devices described in the context of the previous embodiments, and the following explanation focuses on the differences in respect of the hardware configuration. It should be noted that the illustrated hardware configuration can be applied both to the wireless communication device that operates as a base station and to the wireless communication device that operates as a slave station.

This wireless communication device includes a baseband unit 211, an RF unit 221, and antennas 50(1) to 50(N) (where N is an integer equal or larger than one).

The baseband unit 211 includes a control circuit 212, a transmission processing circuit 213, a reception processing circuit 214, DA conversion circuits 215, 216, and AD conversion circuits 217, 218. The RF unit 221 and the baseband unit 211 may be collectively configured as one-chip IC (integrated circuit) or may be configured as independent chips.

As one example, the baseband unit 211 is a baseband LSI or a baseband IC. Alternatively, the baseband unit 211 may include an IC 232 and an IC 231 in the illustrated manner as indicated by dotted lines. In this context, components may be incorporated in a distributed manner on these ICs such that the IC 232 includes the control circuit 212, the transmission processing circuit 213, and the reception processing circuit 214 while the IC 231 includes the DA conversion circuits 215, 216 and the AD conversion circuits 217, 218. The control circuit 212, the transmission processing circuit 213, the reception processing circuit 214, or any combination thereof includes control circuitry.

The control circuit 212 is mainly configured to execute the functionality of the MAC processor 30 and 130 of FIGS. 3A and 3B, etc. The functionality of the upper layer processor 40 and 140 may be included in the control circuit 112.

The transmission processing circuit 213 corresponds to the section that performs the processing before DA conversion processing in the transmitter 21 and 121 in FIGS. 3A and 3B, etc. Specifically, the transmission processing circuit 213 mainly performs processing associated with the physical layer including addition of a preamble and a PHY header, encoding, modulation (which may include MIMO modulation), and generates, for example, two types of digital baseband signals (hereinafter referred to as the digital I-signal and Q-signal). It should be noted that another configuration can be contemplated according to which the functionality performed before DA conversion processing in the transmitter 21 and 121 of FIGS. 3A and 3B, etc. may be included in the transmission processing circuit 213, the functionality performed after AD conversion processing in the receiver 22 and 122 may be included in the reception processing circuit 214.

The communication processing device of this embodiment corresponds, for example, to the control circuit 212, the transmission processing circuit 213, and the reception processing circuit 214. The communication processing device of this embodiment may take either configuration of a one-chip IC configuration or a multiple-chip IC configuration.

The DA conversion circuits 215 and 216 correspond to the section associated with the digital-to-analog conversion in the transmitter 21 and 121 of FIGS. 3A and 3B, etc. The DA conversion circuits 215 and 216 are configured to perform digital-to-analog conversion for the signals input from the transmission processing circuit 213. More specifically, the DA conversion circuit 215 converts a digital I-signal into an analog I-signal, and the DA conversion circuit 216 converts a digital Q-signal into an analog Q-signal. It should be noted that there may be a case where the signals are transmitted as single-channel signals without the quadrature modulation being performed. In this case, it suffices that one single DA conversion circuit is provided. In addition, when transmission signals of one single channel or multiple channels are transmitted in a distributed manner in accordance with the number of antennas, DA conversion circuits may be provided in the number corresponding to the number of the antennas.

The RF unit 221, by way of example, is an RF analog IC or a high-frequency wave IC. The transmitting circuit 222 in the RF unit 221 corresponds to the section associated with the processing following the digital-to-analog conversion out of the functions of the transmitter 21 and 121 illustrated in FIGS. 3A and 3B, etc. The transmitting circuit 222 includes a transmission filter that extracts a signal of a desired bandwidth from the signal of the frame that has been subjected to the digital-to-analog conversion by the DA conversion circuits 215 and 216, a mixer that performs up-conversion for the signal that has been subjected to the filtering to the wireless frequency using a signal having a predetermined frequency supplied from an oscillation device, a pre-amplifier (PA) that performs amplification for the signal that has been subjected to the up-conversion, and the like.

The receiving circuit 223 in the RF unit 221 corresponds to the section associated with the processing prior to the analog-to-digital conversion from among the functions of the receiver 22 and 122 illustrated in FIGS. 3A and 3B, etc. The receiving circuit 223 includes an LNA (low noise amplifier) that amplifies the signal received by the antenna, a mixer that performs down-conversion of the amplified signal to the baseband using a signal having a predetermined frequency supplied from an oscillation device, a reception filter that extracts a signal of a desired bandwidth from the signal that has been subjected to the down-conversion, and the like. More specifically, the receiving circuit 223 performs quadrature demodulation for the reception signal, which has been subjected to the low noise amplification by a low noise amplifier, by carrier waves with 90 degree phase shift with respect to each other and thus generates an I-signal (In-phase signal) having the same phase as that of the reception signal and a Q-signal (Quad-phase signal) whose phase is delayed by 90 degrees with respect to the reception signal. The I-signal and the Q-signal are output from receiving circuit 223 after being subjected to the gain adjustment.

The control circuit 212 may control the operation of the transmission filter of the transmitting circuit 222 and the reception filter of the receiving circuit 223. Another controller that controls the transmitting circuit 222 and the receiving circuit 223 may be provided and the same or similar control may be realized by the control circuit 212 sending instructions to that controller.

The AD conversion circuits 217, 218 in the baseband unit 211 correspond to the section of the receiver 22 and 122 that performs the analog-to-digital conversion as illustrated in FIGS. 3A and 3B, etc. The AD conversion circuits 217, 218 perform analog-to-digital conversion for the input signal that is input from the receiving circuit 223. More specifically, the AD conversion circuit 217 converts the I-signal into a digital I-signal and the AD conversion circuit 218 converts the Q-signal into a digital Q-signal. It should be noted that quadrature demodulation may not be performed and only a single-channel signal may be received. In this case, only one AD conversion circuit has to be provided. In addition, when a plurality of antennas are provided, AD conversion circuits in the number corresponding to the number of the antennas may be provided. The reception processing circuit 214 corresponds to the section that performs the processing following the AD conversion processing in the receiver 22 and 122 as illustrated in FIGS. 3A and 3B, etc. Specifically, the reception processing circuit 214 performs demodulation processing for the signal that has been subjected to the analog-to-digital conversion, processing of removing the preamble and the PHY header, and the like processing, and delivers the frame that has been processed to the control circuit 212.

It should be noted that a switch may be arranged in the RF unit for switching the antennas 50(1) to 50(N) between the transmitting circuit 222 and the receiving circuit 223. By controlling the switch, the antennas 50(1) to 50(N) may be connected to the transmitting circuit 222 at the time of transmission and the antennas 50(1) to 50(N) may be connected to the receiving circuit 223 at the time of reception.

Although the DA conversion circuits 215, 2116 and the AD conversion circuits 217, 218 are arranged on the side of the baseband unit 211 in FIG. 21, another configuration may be adopted where they are arranged on the side of the RF unit 221.

It should be noted that the wireless communicator may be formed by the transmitting circuit 222 and the receiving circuit 223. The wireless communicator may be formed by further adding DAs 215, 216 and the DAs 217, 218 to the transmitting circuit 222 and the receiving circuit 223. The wireless communicator may be formed by including, along with these components, the PHY processing portions (i.e., the modulator and the demodulator) of the transmission processing circuit 213 and the reception processing circuit 214. Alternatively, the wireless communicator may be formed by the PHY reception processing portions of the transmission processing circuit 113 and the reception processing circuit 114.

Embodiment 10

Figure 22:
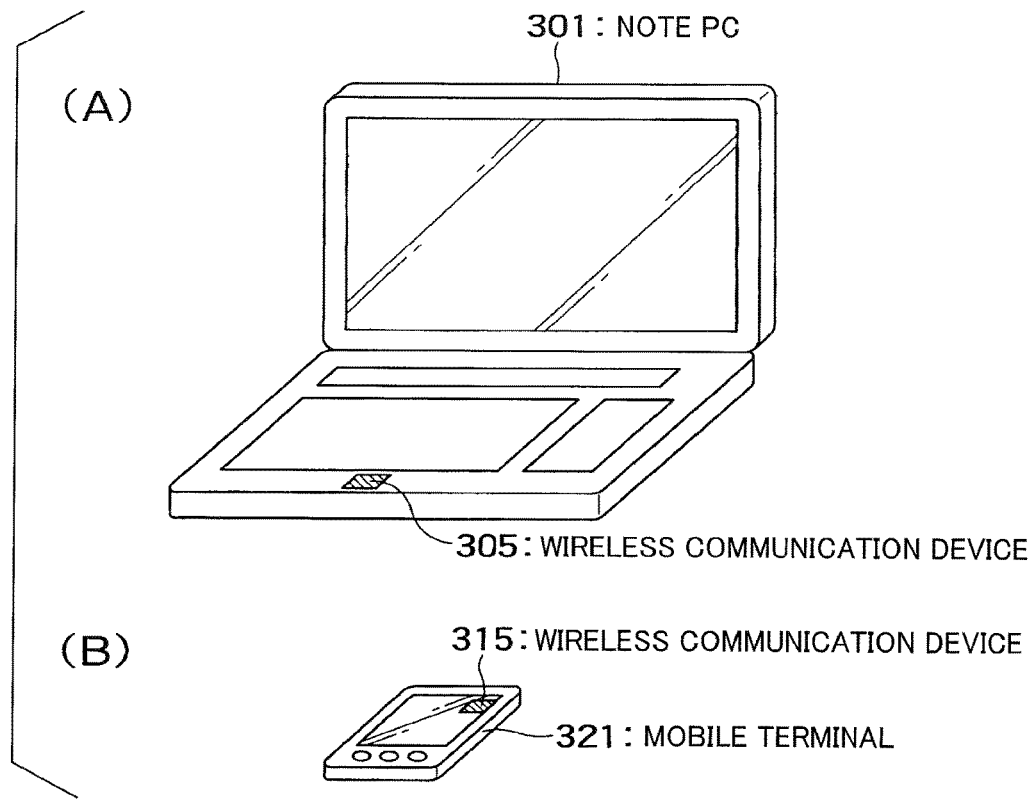
FIG. 22 is a perspective view of a wireless communication terminal relating to an embodiment 10.

FIGS. 22(A) and 22(B) are perspective views of a wireless communication terminal (wireless device) in accordance with embodiment 10. The wireless device of FIG. 22(A) is a laptop PC 301 and the wireless device of FIG. 22(B) is a mobile terminal 321. They correspond, respectively, to one form of the terminal (which may operate as either the base station or the slave station). The laptop PC 301 and the mobile terminal 321 incorporate the wireless communication devices 305, 315, respectively. The wireless communication devices that are previously described may be used as the wireless communication devices 305, 315. The wireless device incorporating the wireless communication device is not limited to the laptop PC or the mobile terminal. For example, the wireless communication device may be incorporated in a television, digital camera, wearable device, tablet, smartphone, etc.

Figure 23:
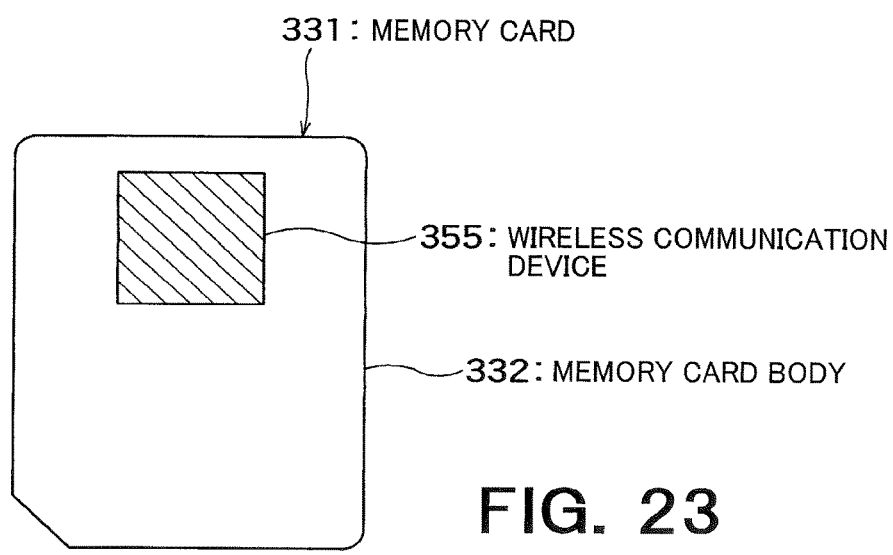
FIG. 23 is a diagram illustrating a memory card relating to the embodiment 10.

In addition, the wireless communication device can be incorporated in a memory card. FIG. 23 illustrates an example where the wireless communication device is incorporated in the memory card. The memory card 331 includes a wireless communication device 355 and a memory card body 332. The memory card 331 uses the wireless communication device 335 for wireless communications with external devices. It should be noted that the illustration of the other elements in the memory card 331 (e.g., memory, etc.) is omitted in FIG. 23.

Embodiment 11

Embodiment 11 includes a bus, a processor, and an external interface in addition to the configuration of the wireless communication device in accordance with any one of the first to tenth embodiments. The processor and the external interface are connected via the bus to the buffer. The firmware runs on the processor. In this manner, by providing a configuration where the firmware is included in the wireless communication device, it is made possible to readily modify the functionality of the wireless communication device by re-writing of the firmware.

Embodiment 12

Embodiment 12 includes a clock generator in addition to the configuration of the wireless communication device in accordance with any one of the first to tenth embodiments. The clock generator is configured to generate a clock and output the clock on the output terminal and to the outside of the wireless communication device. In this manner, by outputting the clock generated within the wireless communication device to the outside thereof and causing the host side to operate based on the clock output to the outside, it is made possible to cause the host side and the wireless communication device side to operate in a synchronized manner.

Embodiment 13

Embodiment 13 includes a power source, a power source controller, and a wireless power supply in addition to the configuration of the wireless communication device in accordance with any one of the first to tenth embodiments. The power source controller is connected to the power source and the wireless power supply, and is configured to perform control for selecting the power source from which power is supplied to the wireless communication device. In this manner, by providing a configuration where the power source is provided in the wireless communication device, it is made possible to achieve low power consumption operation accompanied by the power source control.

Embodiment 14

Embodiment 14 includes a SIM card in addition to the configuration of the wireless communication device in accordance with the embodiment 13. The SIM card is connected, for example, to the MAC processor in the wireless communication device or to the control circuit 212, etc. In this manner, by providing a configuration where the SIM card is provided in the wireless communication device, it is made possible to readily perform the authentication processing.

Embodiment 15

Embodiment 15 includes a video compression/extension unit in addition to the configuration of the wireless communication device in accordance with the embodiment 11. The video compression/extension unit is connected to a bus. In this manner, by configuring the video compression/extension unit included in the wireless communication device, it is made possible to readily perform transfer of the compressed video and the extension of the received compressed video.

Embodiment 16

Embodiment 16 includes an LED unit in addition to the configuration of the wireless communication device in accordance with any one of the first to tenth embodiments. The LED unit is connected, for example, to the MAC processor in the wireless communication device, the transmission processing circuit 213, the reception processing circuit 214, or the control circuit 212, etc. In this manner, by providing a configuration where the LED unit is provided in the wireless communication device, it is made possible to readily notify the operating state of the wireless communication device to the user.

Embodiment 17

Embodiment 17 includes a vibrator unit in addition to the configuration of the wireless communication device in accordance with any one of the first to tenth embodiments. The vibrator unit is connected, for example, to the MAC processor in the wireless communication device, the transmission processing circuit 213, the reception processing circuit 214, or the control circuit 212, etc. In this manner, by providing a configuration in which the vibrator unit is provided in the wireless communication device, it is made possible to readily notify the operating state of the wireless communication device to the user.

Embodiment 18

Figure 24:
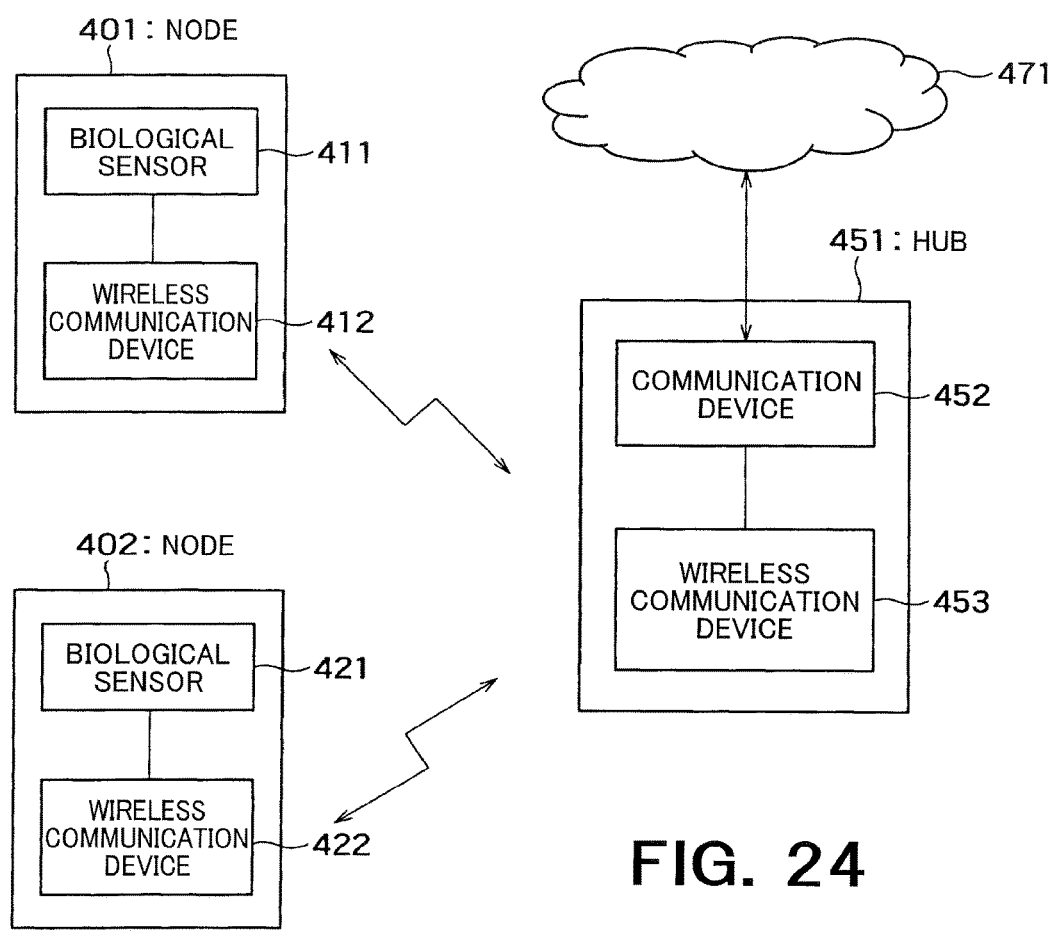
FIG. 24 is a diagram illustrating a wireless communication system relating to an embodiment 18.

FIG. 24 illustrates an overall configuration of a wireless communication system in accordance with embodiment 18. This wireless communication system is an example of the body area network. The wireless communication system includes a plurality of nodes including nodes 401, 402 and a hub 451. Each node and the hub are attached to the human body, and each node performs wireless communication with the hub 451. Being attached to the human body may refer to any case where it is arranged at a position near the human body such as a form in which it is in direct contact with the human body; a form in which it is attached thereto with clothes existing in between; a form in which it is provided on a strap hanging from the neck; and a form in which it is accommodated in a pocket. The hub 451 is, by way of example, a terminal including a smartphone, mobile phone, tablet, laptop PC, etc.

The node 401 includes a biological sensor 411 and a wireless communication device 412. As the biological sensor 411, for example, sensors may be used that are adapted to sense body temperature, blood pressure, pulse, electrocardiogram, heartbeat, blood oxygen level, urinal sugar, blood sugar, etc. Meanwhile, sensors adapted to sense biological data other than these may be used. The wireless communication device 412 is any one of the wireless communication devices of the embodiments that are described in the foregoing. The wireless communication device 412 performs wireless communication with the wireless communication device 453 of the hub 451. The wireless communication device 412 performs wireless transmission of the biological data (sensing information) sensed by the biological sensor 411 to the wireless communication device 453 of the hub 451. The node 401 may be configured as a device in the form of a tag.

The node 402 includes a biological sensor 421 and a wireless communication device 422. The biological sensor 421 and the wireless communication device 422, the explanations of which are omitted, are configured in the same or similar manner as the biological sensor 411 and the wireless communication device 412 of the node 401, respectively.

The hub 451 includes a communication device 452 and a wireless communication device 453. The wireless communication device 453 performs wireless communications with the wireless communication device of each node. The wireless communication device 453 may be the wireless communication device described in the context of the previous embodiments or may be another wireless communication device other than those described in the foregoing as long as it is capable of communications with the wireless communication device of the node. The communication device 452 is wire or wireless-connected to the network 471. The network 471 may be the Internet or a network such as a wireless LAN, or may be a hybrid network constructed by a wired network and a wireless network. The communication device 452 transmits the data collected by the wireless communication device 453 from the individual nodes to devices on the network 471. The delivery of data from the wireless communication device 453 to the communication devices may be performed via a CPU, a memory, an auxiliary storage device, etc. The devices on the network 471 may, specifically, be a server device that stores data, a server device that performs data analysis, or any other server device. The hub 451 may also incorporate a biological sensor in the same or similar manner as the nodes 401 and 402. In this case, the hub 451 also transmits the data obtained by the biological sensor to the devices on the network 471 via the communication device 452. An interface may be provided in the hub 451 for insertion of a memory card such as an SD card and the like and the data obtained by the biological sensor or obtained from each node may be stored in the memory card. In addition, the hub 451 may incorporate a user inputter configured to input various instructions by the user and a display for image display of the data, etc.

Figure 25:
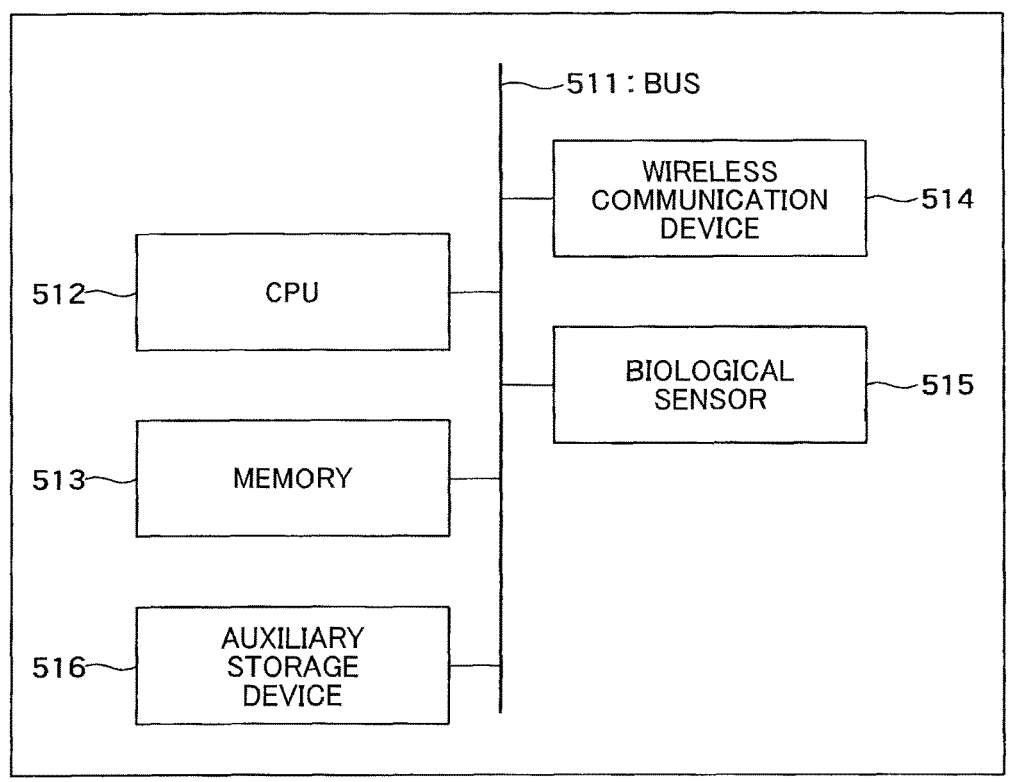
FIG. 25 is a hardware block diagram of a node relating to the embodiment 18.

FIG. 25 is a block diagram illustrating a hardware configuration of the node 401 or node 402 illustrated in FIG. 24. The CPU 512, the memory 513, the auxiliary storage device 516, the wireless communication device 514, and the biological sensor 515 are connected to a bus 511. Here, the individual components 512 to 516 are connected to one single bus, but a plurality of buses may be provided by a chipset and the individual units 512 to 516 may be connected in a distributed manner to the plurality of buses. The wireless communication device 514 corresponds to the wireless communication devices 412, 422 of FIG. 24, and the biological sensor 515 corresponds to the biological sensor 411, 421 of FIG. 24. The CPU 512 controls the wireless communication device 514 and the biological sensor 515. The auxiliary storage device 516 is a device that permanently stores data such as an SSD, a hard disk, etc. The auxiliary storage device 516 stores a program to be executed by the CPU 512. In addition, the auxiliary storage device 516 may store data obtained by the biological sensor 515. The CPU 512 reads the program from the auxiliary storage device 516, develops it in the memory 513, and thus executes it. The memory 513 may be volatile memory such as DRAM, etc., or may be non-volatile memory such as MRAM, etc. The CPU 512 drives the biological sensor 515, stores data obtained by the biological sensor 515 in the memory 513 or the auxiliary storage device 516, and transmits the data to the hub via the wireless communication device 514. The CPU 512 may execute processing associated with communication protocols of layers higher than the MAC layer and processing associated with the application layer.

Figure 26:
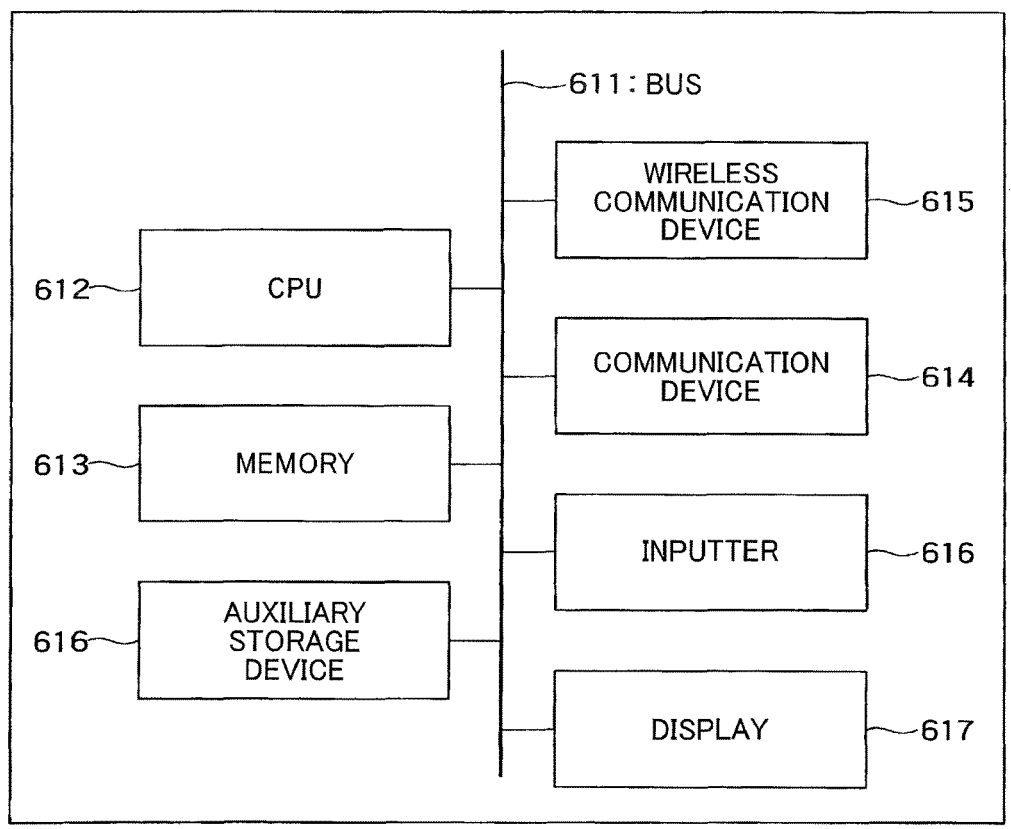
FIG. 26 is a hardware block diagram of a hub relating to the embodiment 18.

FIG. 26 is a block diagram that illustrates a hardware configuration of the hub 451 illustrated in FIG. 24. A CPU 612, a memory 613, an auxiliary storage device 616, a communication device 614, a wireless communication device 615, an inputter 616 and a display 617 are connected to a bus 611. Here, the individual units 612 to 617 are connected to one single bus, but a plurality of buses may be provided by a chipset and the individual units 612 to 617 may be connected in a distributed manner to the plurality of buses. A biological sensor or a memory card interface may further be connected to the bus 611. The inputter 616 is configured to receive various instruction inputs from the user and output signals corresponding to the input instructions to the CPU 612. The display 617 provides image display of the data, etc. as instructed by the CPU 612. The communication device 614 and the wireless communication device 615 correspond to the communication device 452 and the wireless communication device 453 provided in the hub of FIG. 24, respectively. The CPU 612 controls the wireless communication device 615 and the communication device 614. The auxiliary storage device 616 is a device that permanently stores data such as an SSD, a hard disk, etc. The auxiliary storage device 616 stores a program executed by the CPU 612 and may store data received from each node. The CPU 612 reads the program from the auxiliary storage device 616, develops it in the memory 613, and executes it. The memory 613 may be volatile memory such as DRAM, etc., or may be non-volatile memory such as MRAM, etc. The CPU 612 stores data received by the wireless communication device 615 from each node in the memory 613 or the auxiliary storage device 616, and transmits the data to the network 471 via the communication device 614. The CPU 612 may execute processing associated with communication protocols of layers higher than the MAC layer and processing associated with the application layer.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An electronic apparatus capable of communicating using a first frequency channel under a first communication scheme based on a carrier sense and communicating using a second frequency channel different from the first frequency channel under a second communication scheme different from the first communication scheme, comprising:
   control circuitry configured to:
      determine whether transmission data is required to transmit preferentially according to a type of the transmission data; and
      select the second frequency channel from the first frequency channel and the second frequency channel, when the transmission data is required to transmit preferentially; and
   transmitter circuitry configured to transmit the transmission data during an available slot using the second frequency channel.

2. The apparatus according to claim 1,
   wherein the first communication scheme is a carrier sense multiple access scheme, and
   the second communication scheme is a time division multiple access scheme.

3. The apparatus according to claim 1,
   wherein the transmitter circuitry performs when the transmission data is required to preferentially transmit, at least one of: transmitting the transmission data using the first frequency channel, transmitting the transmission data using a slot previously allocated in the second frequency channel, or transmitting the transmission data using an available slot in the second frequency channel.

4. The apparatus according to claim 1,
wherein the transmitter circuitry performs, when the transmission data is required to preferentially transmit, at least two of transmitting the transmission data using the first frequency channel, transmitting the transmission data using a slot allocated previously in the second frequency channel, or transmitting the transmission data using an available slot in the second frequency channel.

5. The apparatus according to claim 4,
wherein the transmitter circuitry performs transmitting the transmission data using the first frequency channel and transmitting the transmission data using the available slot in the second frequency channel.

6. The apparatus according to claim 5,
wherein the transmitter circuitry performs transmitting the transmission data using the first frequency channel before transmitting the transmission data using an available slot in the second frequency channel, or performs them in a reverse order.

7. The apparatus according to claim 4,
wherein the transmitter circuitry performs the at least two transmitting, according to an allocation status of slots to other wireless communication devices in the second frequency channel.

8. The apparatus according to claim 1,
wherein the transmitter circuitry uses an available slot in the second frequency channel without transmitting a slot allocation request.

9. The apparatus according to claim 1,
wherein the transmitter circuitry transmits a notification signal specifying a slot to be used in the second frequency channel using the first frequency channel, and
the transmitter circuitry transmits the transmission data at the second frequency channel using the slot specified by the notification signal after the notification signal is transmitted.

10. The apparatus according to claim 9,
wherein the notification signal includes an identifier of the transmission data, and information related to the slot to be used in the second frequency channel.

11. The apparatus according to claim 1,
wherein the transmitter circuitry transmits the transmission data by a slot allocated previously in the second frequency channel, in the case that the transmission data is not required to preferentially transmit.

12. The apparatus according to claim 1,
wherein the transmission data includes sensing information by a sensor, and
the control circuitry determines whether the transmission data is required to preferentially transmit based on at least one of a type of the sensor, the sensing information by the sensor, and a state of the sensor.

13. An electronic apparatus capable of communicating using a first frequency channel under a first communication scheme based on a carrier sense and communicating under a second communication scheme based on a time division using a second frequency channel, the second communication scheme being different from the first communication scheme, comprising:
control circuitry to determine whether transmission data is required to preferentially transmit according to a type of the transmission data and select the first frequency channel from among the first frequency channel and the second frequency channel, when the transmission data is required to transmit preferentially; and
transmitter circuitry configured to transmit the transmission data using the first frequency channel.

14. The apparatus according to claim 13,
wherein the first communication scheme is a carrier sense multiple access scheme and the second communication scheme is a time division multiple access scheme.

15. The apparatus according to claim 14,
wherein the transmitter circuitry transmits an allocation request for a slot in the second frequency channel using the first frequency channel,
the apparatus comprises receiver circuitry configured to receive a response sent by the first frequency channel, and
the transmitter circuitry transmits the transmission data using the slot specified by the response.

16. The apparatus according to claim 15,
wherein the transmitter circuitry transmits the allocation request in the case that a size of the transmission data is equal to or larger than a predetermined value, and
the transmitter circuitry uses the available slot in the second frequency channel without transmitting the allocation request in the case that the size of the transmission data is smaller than the predetermined value.

17. The apparatus according to claim 16,
wherein the predetermined value indicates a data size transmittable by one slot.

18. The apparatus according to claim 15,
wherein the control circuitry sets a frequency channel to the first frequency channel before transmitting the allocation request, and switches the frequency channel to the second frequency channel after a response to the allocation request is received.

19. The apparatus according to claim 15,
wherein the allocation request includes an identifier of the transmission data, and information related to a number of allocation-requested slots in the second frequency channel.

20. A communication method capable of communicating using a first frequency channel under a first communication scheme based on a carrier sense and communicating using a second frequency channel different from the first frequency channel under a second communication scheme different from the first communication scheme, comprising:
determining whether transmission data is required to transmit preferentially according to a type of the transmission data;
selecting the second frequency channel from the first frequency channel and the second frequency channel, when the transmission data is required to transmit preferentially; and
transmitting the transmission data during an available slot using the second frequency channel.

21. A communication method capable of communicating using a first frequency channel under a first communication scheme based on a carrier sense and communicating under a second communication scheme based on a time division using a second frequency channel, the second communication scheme being different from the first communication scheme, comprising:
determining whether transmission data is required to preferentially transmit according to a type of the transmission data and selecting the first frequency channel from among the first frequency channel and the second frequency channel, when the transmission data is required to transmit preferentially; and transmitting the transmission data using the first frequency channel.

* * * * *